(12) United States Patent
Kupershmidt et al.

(10) Patent No.: US 10,275,711 B2
(45) Date of Patent: *Apr. 30, 2019

(54) SYSTEM AND METHOD FOR SCIENTIFIC INFORMATION KNOWLEDGE MANAGEMENT

(75) Inventors: Ilya Kupershmidt, San Francisco, CA (US); Qiaojuan Jane Su, San Jose, CA (US); Francois Andry, Menlo Park, CA (US)

(73) Assignee: Nextbio, San Diego, CA (US)

( * ) Notice: Subject to any disclaimer, the term of this patent is extended or adjusted under 35 U.S.C. 154(b) by 575 days.

This patent is subject to a terminal disclaimer.

(21) Appl. No.: 13/588,526

(22) Filed: Aug. 17, 2012

(65) Prior Publication Data

US 2013/0166599 A1 Jun. 27, 2013

Related U.S. Application Data

(62) Division of application No. 11/641,539, filed on Dec. 18, 2006, now Pat. No. 8,275,737.

(60) Provisional application No. 60/750,829, filed on Dec. 16, 2005.

(51) Int. Cl.
*G06N 5/02* (2006.01)
*G06F 16/21* (2019.01)
*G06F 17/00* (2019.01)
*G06N 5/04* (2006.01)

(52) U.S. Cl.
CPC .............. *G06N 5/02* (2013.01); *G06F 16/21* (2019.01)

(58) Field of Classification Search
CPC .......... G06N 5/04; G06N 5/022; G06N 7/026; G06Q 10/06; G06Q 10/10

USPC ........................................................ 706/60
See application file for complete search history.

(56) References Cited

U.S. PATENT DOCUMENTS

| | | | |
|---|---|---|---|
| 5,153,178 | A | 10/1992 | Maroko |
| 5,495,077 | A | 2/1996 | Miller et al. |
| 6,122,636 | A | 9/2000 | Malloy et al. |
| 6,151,601 | A | 11/2000 | Papicmak et al. |
| 6,185,561 | B1 | 2/2001 | Balaban et al. |

(Continued)

FOREIGN PATENT DOCUMENTS

| | | |
|---|---|---|
| JP | 2002-528095 A | 9/2002 |
| JP | 2004/152035 A | 5/2004 |

(Continued)

OTHER PUBLICATIONS

Kupershmidt, Ilya, et al., U.S. Appl. No. 11/641,539 titled, "System and Method for Scientific Information Knowledge Management," filed Dec. 18, 2006.

(Continued)

*Primary Examiner* — Miranda M Huang
*Assistant Examiner* — Viker A Lamardo
(74) *Attorney, Agent, or Firm* — Weaver Austin Villeneuve & Sampson LLP

(57) ABSTRACT

The present invention relates to methods, systems and apparatus for capturing, integrating, organizing, navigating and querying large-scale data from high-throughput biological and chemical assay platforms. It provides a highly efficient meta-analysis infrastructure for performing research queries across a large number of studies and experiments from different biological and chemical assays, data types and organisms, as well as systems to build and add to such an infrastructure.

21 Claims, 31 Drawing Sheets

(56) References Cited

U.S. PATENT DOCUMENTS

| | | | |
|---|---|---|---|
| 6,286,002 | B1 | 9/2001 | Axaopoulos et al. |
| 6,408,308 | B1 | 6/2002 | Maslyn et al. |
| 6,465,183 | B2 | 10/2002 | Wolber |
| 6,580,910 | B1 | 6/2003 | Mazur et al. |
| 6,836,877 | B1 | 12/2004 | Dupenloup |
| 6,925,455 | B2 | 8/2005 | Gong et al. |
| 6,947,846 | B2 | 9/2005 | Quake et al. |
| 7,035,739 | B2 * | 4/2006 | Schadt ............... G06F 19/12 365/94 |
| 7,072,665 | B1 | 7/2006 | Blumberg et al. |
| 7,103,519 | B2 | 9/2006 | Singarajan et al. |
| 7,155,453 | B2 | 12/2006 | Kincaid |
| 7,225,183 | B2 | 5/2007 | Gardner |
| 7,243,112 | B2 | 7/2007 | Qu et al. |
| 7,718,354 | B2 | 5/2010 | Ecker et al. |
| 7,761,392 | B2 | 7/2010 | Mohamed et al. |
| 7,798,401 | B2 | 9/2010 | Jung et al. |
| 7,930,172 | B2 | 4/2011 | Bellegarda |
| 8,071,309 | B2 | 12/2011 | Ecker et al. |
| 8,078,217 | B2 | 12/2011 | Garcia |
| 8,275,737 | B2 * | 9/2012 | Kupershmidt ........... G06N 5/02 706/45 |
| 8,364,665 | B2 | 1/2013 | Su et al. |
| 8,655,817 | B2 | 2/2014 | Hasey et al. |
| 9,141,913 | B2 | 9/2015 | Kupershmidt et al. |
| 9,183,349 | B2 | 11/2015 | Kupershmidt et al. |
| 9,633,166 | B2 | 4/2017 | Kupershmidt et al. |
| 2001/0005852 | A1 | 6/2001 | Bogle et al. |
| 2001/0016314 | A1 | 8/2001 | Anderson et al. |
| 2002/0093591 | A1 | 7/2002 | Gong et al. |
| 2002/0137031 | A1 | 9/2002 | Wolber |
| 2002/0150966 | A1 | 10/2002 | Muraca |
| 2002/0159642 | A1 | 10/2002 | Whitney |
| 2002/0177138 | A1 | 11/2002 | Boissy |
| 2002/0197632 | A1 | 12/2002 | Moskowitz |
| 2003/0055619 | A1 | 3/2003 | Singarajan et al. |
| 2003/0182281 | A1 * | 9/2003 | Wittkowski ............ G06F 17/18 |
| 2004/0071700 | A1 | 4/2004 | Kim et al. |
| 2004/0073955 | A1 | 4/2004 | Chung |
| 2004/0122708 | A1 | 6/2004 | Avinash et al. |
| 2004/0122790 | A1 * | 6/2004 | Walker ................. G06F 19/321 |
| 2004/0162852 | A1 | 8/2004 | Qu et al. |
| 2004/0249791 | A1 * | 12/2004 | Waters ................... G06F 19/28 |
| 2005/0081188 | A1 | 4/2005 | Kumar et al. |
| 2005/0196817 | A1 * | 9/2005 | Kingsmore ........ G01N 33/6893 435/7.92 |
| 2005/0216426 | A1 * | 9/2005 | Weston ................. G06K 9/6215 706/12 |
| 2006/0020399 | A1 * | 1/2006 | Shishiki .................. G06F 19/24 702/20 |
| 2006/0064415 | A1 * | 3/2006 | Guyon .................... G06F 19/24 |
| 2006/0173828 | A1 * | 8/2006 | Rosenberg ........ G06F 17/30867 |
| 2006/0253262 | A1 | 11/2006 | Ching et al. |
| 2006/0277016 | A1 | 12/2006 | Kouchi et al. |
| 2006/0287106 | A1 | 12/2006 | Jensen |
| 2007/0038867 | A1 * | 2/2007 | Verbauwhede ......... G06F 21/32 713/186 |
| 2007/0118399 | A1 | 5/2007 | Avinash et al. |
| 2007/0156692 | A1 | 7/2007 | Rosewarne |
| 2007/0162411 | A1 | 7/2007 | Kupershmidt et al. |
| 2008/0075789 | A1 | 3/2008 | Vawter et al. |
| 2008/0103995 | A1 | 5/2008 | Mohamed et al. |
| 2008/0144124 | A1 | 6/2008 | Samadani et al. |
| 2008/0147451 | A1 | 6/2008 | Schnack |
| 2008/0155018 | A1 | 6/2008 | Fortier et al. |
| 2009/0041862 | A1 | 2/2009 | Schofield et al. |
| 2009/0049019 | A1 | 2/2009 | Su et al. |
| 2009/0222400 | A1 | 9/2009 | Kupershmidt et al. |
| 2009/0238465 | A1 | 9/2009 | Lee et al. |
| 2010/0115421 | A1 | 5/2010 | Bejjani et al. |
| 2010/0172567 | A1 | 7/2010 | Prokoski |
| 2010/0277650 | A1 | 11/2010 | Matsuzaki |
| 2010/0279423 | A1 | 11/2010 | Brennan et al. |
| 2010/0305806 | A1 | 12/2010 | Hawley |
| 2010/0318528 | A1 | 12/2010 | Kupershmidt et al. |
| 2011/0119209 | A1 | 5/2011 | Kirshenbaum et al. |
| 2011/0179066 | A1 | 7/2011 | Cardno et al. |
| 2011/0263445 | A1 | 10/2011 | Wolber |
| 2013/0144916 | A1 | 6/2013 | Lum et al. |
| 2013/0166320 | A1 | 6/2013 | Kupershmidt et al. |
| 2015/0193576 | A9 | 7/2015 | Kupershmidt et al. |
| 2016/0132641 | A1 | 5/2016 | Kupershmidt et al. |
| 2016/0232224 | A1 | 8/2016 | Kupershmidt et al. |
| 2017/0177793 | A1 | 6/2017 | Kupershmidt et al. |

FOREIGN PATENT DOCUMENTS

| | | |
|---|---|---|
| JP | 2004-535612 A | 11/2004 |
| JP | 2005-518793 A | 6/2005 |
| JP | 2005/309836 A | 11/2005 |
| JP | 2009-520278 A | 5/2009 |
| WO | 2000/0024936 | 5/2000 |
| WO | 01/55951 | 8/2001 |
| WO | 2007/075488 | 7/2007 |
| WO | 2009/039425 | 3/2009 |
| WO | 2009/111581 | 9/2009 |

OTHER PUBLICATIONS

Su, Qiaojuan Jane, et al., U.S. Appl. No. 12/234,435 titled, "Directional Expression-Based Scientific Information Knowledge Management," filed Sep. 19, 2008.

Kupershmidt, Ilya, et al., U.S. Appl. No. 12/398,107 titled, "Categorization and Filtering of Scientific Data," filed Mar. 4, 2009.

PCT Notification of Transmittal of the International Search Report and the Written Opinion of the International Searching Authority, or the Declaration, dated Mar. 20, 2008, Application No. PCT/US 2006/048067.

PCT Notification of Transmittal of the International Search Report and the Written Opinion of the International Searching Authority, or the Declaration, dated Dec. 4, 2008, Application No. PCT/US 08/77097.

PCT Notification of Transmittal of the International Search Report and the Written Opinion of the International Searching Authority, or the Declaration, dated May 6, 2009, Application No. PCT/US 06/36058, 9 pages.

Raja, Alexandra, "Querying Microarray Databases," Masters Thesis, University of Texas, Published Dec. 2005, retrieved by Foreign Examiner on Apr. 21, 2009, Retrieved from the Internet: <URL: https://dspace.uta.edu/bitstream/10106/251/1/umi-uta-1117.pdf>, 163 pages.

Office Action dated Sep. 29, 2010 from U.S. Appl. No. 11/641,539.

Office Action dated Dec. 22, 2010 from U.S. Appl. No. 12/234,435.

Final Office Action dated May 11, 2011 from U.S. Appl. No. 11/641,539.

Kupershmidt, et al., U.S. Appl. No. 12/796,545, titled "Sequence-Centric Scientific Information Management," filed Jun. 8, 2010.

Final Office Action dated Jul. 28, 2011 for U.S. Appl. No. 12/234,435.

Supplemental European Search Report dated Mar. 23, 2012, Application No. EP 06 84 7688.6.

Barrett, T., et al., "NCBI GEO: Mining Millions of Expression Profiles—Database and Tools," vol. 33, Nucleic Acids Research, Database Issue, 2005, pp. D562-0566.

Shah, S. P., et al., "Atlas—a Data Warehouse for Integrative Bioinformatics," London GB, vol. 6, No. 34, Feb. 21, 2005, pp. 1-16.

Liu, W., et al. "Rank-Based Algorithms for Analysis of Microarrays," Proceedings of SPIE, US, vol. 4266, Jun. 1, 2001, pp. 56-67.

Kupershmidt, et al., "Ontology-Based Meta-Analysis of Global Collections of High-Throughput Public Data," PLOS ONE, vol. 5, No. 9, Sep. 2010, pp. 1-13.

Office Action dated Jan. 24, 2012 for U.S. Appl. No. 12/398,107.

Office Action dated Jan. 26, 2012 for U.S. Appl. No. 12/796,545.

Japanese Office Action dated May 22, 2012, Application No. 2008-545870.

Rashef, et al., "Detecting Novel Associations in Large Data Sets," Science, 2011, vol. 334, pp. 1518-1524.

(56) References Cited

OTHER PUBLICATIONS

Ganter, et al. "Development of a large-scale chemogenomics database to improve drug candidate selection and to understand mechanisms of chemical toxicity and action," *Journal of Biotechnology*, vol. 119, 2005, pp. 219-244.
Lamb, et al., "The Connectivity Map: using gene-expression signatures to connect small molecules, genes, and disease," *Science*, 2006, vol. 313, pp. 1929-1935.
Engreit, et al., "ProfileChaser: searching microarray repositories based on genome-wide patterns of differential expression," 10(11):R130, 2011, 1;27(23), pp. 3317-3318.
Wu, et al, "BioGPS: an extensible and customizable portal for querying and organizing gene annotation resources," *Genome Biol.*, 2009, 10(11):R130, 12 pages.
Notice of Allowance dated Jul. 19, 2012 from U.S. Appl. No. 11/641,539.
Notice of Allowance dated Sep. 28, 2012, issued in U.S. Appl. No. 12/234,435.
Final Office Action dated Oct. 5, 2012, issued in U.S. Appl. No. 12/398,107.
Final Office Action dated Oct. 12, 2012, issued in U.S. Appl. No. 12/796,545.
Office Action dated Sep. 23, 2013, issued in U.S. Appl. No. 12/796,545.
Office Action dated Oct. 10, 2013, issued in U.S. Appl. No. 13/621,756.
U.S. Appl. No. 11/640,121, filed Dec. 15, 2006, Su et al.
U.S. Appl. No. 13/621,736, filed Sep. 17, 2012, Kupershmidt et al.
U.S. Appl. No. 14/828,378, filed Aug. 17, 2015, Kupershmidt et al.
U.S. Office Action dated Aug. 15, 2014, issued in U.S. Appl. No. 12/398,107.
U.S. Final Office Action dated Mar. 13, 2015, issued in U.S. Appl. No. 12/398,107.
U.S. Notice of Allowance dated Jul. 31, 2015, issued in U.S. Appl. No. 12/398,107.
U.S. Office Action dated Jul. 9, 2014, issued in U.S. Appl. No. 12/796,545.
U.S. Office Action dated Mar. 12, 2015, issued in U.S. Appl. No. 12/796,545.
U.S. Notice of Allowance dated Aug. 19, 2015, issued in U.S. Appl. No. 12/796,545.
U.S. Office Action dated Jul. 29, 2014, issued in U.S. Appl. No. 13/621,756.
U.S. Final Office Action dated Feb. 12, 2015, issued in U.S. Appl. No. 13/621,756.
U.S. Office Action dated Jun. 3, 2015, issued in U.S. Appl. No. 13/621,756.
PCT International Preliminary Report on Patentability dated Jun. 18, 2008, issued in PCT/US 2006/048067.
PCT International Preliminary Report on Patentability dated Mar. 24, 2010, issued in PCT/US08/77097.
PCT International Preliminary Report on Patentability dated Sep. 7, 2010, issued in PCT/US06/36058.
Barad, et al. (2004) "MicroRNA expression detected by oligonucleotide microarrays: System establishment and expression profiling in human tissues" Genome Research, 14:2486-2494.
Brown, et al. (2000) "Knowledge-based analysis of microarray gene expression data by using support vector machines" PNAS, 97(1): 262-267.
De La Vega, et al. (2005) "Assessment of two flexible and compatible SNP genotyping platforms: TaqMan® SNP Genotyping Assays and the SNPlex TM Genotyping System," Mutation Research/ Fundamental and Molecular Mechanisms of Mutagenesis, 573(1):111-135.
Dooley, et al. (2003) "Biomarkers of human cutaneous squamous cell carcinoma from tissues and cell lines identified by DNA microarrays and qRT-PCR," Biochemical and Biophysical Research Communications 306:1026-1036.
Jiang, et al. (Nov. 204) "Cluster Analysis for Gene Expression Data: A Survey" IEEE Transactions on Knowledge and Data Engineering, 16(11):1370-1386.
U.S. Final Office Action dated Dec. 17, 2015, issued in U.S. Appl. No. 13/621,756.
U.S. Office Action dated Jul. 28, 2016, issued in U.S. Appl. No. 14/860,412.
U.S. Office Action dated Feb. 24, 2017, issued in U.S. Appl. No. 14/828,378.
U.S. Notice of Allowance dated Dec. 5, 2016, issued in U.S. Appl. No. 14/860,412.
U.S. Office Action dated Jun. 29, 2017, issued in U.S. Appl. No. 15/451,271.

\* cited by examiner

Figure 4

Microsoft Excel -- Hippocampus.txt

File Edit View Insert Format Tool Data Window Help

D76 | AB006198

| | A | B | C | D | E |
|---|---|---|---|---|---|
| 1 | Hippocampus: Neuroactive compound B2104-affected genes | | | | |
| 2 | Brain (frontal cortex) | | | | |
| 3 | Probe set | p-value | Common | Genbank | |
| 4 | 31370_at | 0.05 | | W28191 | |
| 5 | 110_at | 0.05 | CSPG4 | X96753 | |
| 6 | 33619_at | 0.0497 | RPS13 | L01124 | |
| 7 | 39862_at | 0.0495 | KIAA0296 | AA528252 | |
| 8 | 832_at | 0.0494 | UBE2D2 | U39317 | |
| 9 | 1323_at | 0.0493 | UBB | X04803 | |
| 10 | 36973_at | 0.0493 | SF3B2 | U41371 | |
| 11 | 35915_at | 0.0493 | INHBC;INHBC | X82540 | |
| 12 | 38515_at | 0.0492 | BMP7 | X51801 | |
| 13 | 32535_at | 0.0492 | FBN1 | X63556 | |
| 14 | 40934_at | 0.0491 | MGC11308 | W26097 | |
| 15 | 1234_at | 0.049 | EPHA3 | M83941 | |
| 16 | 633_s_at | 0.0488 | TFDP2 | l40386 | |
| 17 | 39542_at | 0.0487 | ENC1 | AF059611 | |
| 18 | 37926_at | 0.0487 | KLF5 | D14520 | |
| 19 | 35121_at | 0.0487 | SLC6A6 | Z18956 | |
| 20 | 37183_at | 0.0486 | GAD1 | M81883 | |
| 21 | 33060_g_at | 0.0485 | | AF070547 | |
| 22 | 40466_at | 0.0485 | NFYC | Z74792 | |
| 23 | 38505_at | 0.0485 | | AL050151 | |
| 24 | 1893_s_at | 0.0484 | | HG3125-HT3301 | |
| 25 | 33642_s_at | 0.0481 | SLC6A8 | U17986 | |
| 26 | 34156_i_at | 0.0481 | H2AFI | AL200373 | |
| 27 | 40704_at | 0.0479 | PIK3CA | Z29090 | |
| 28 | 34848_at | 0.0479 | FDFT1 | X69141 | |
| 29 | 41019_at | 0.0477 | PDCL | AF031463 | |
| 30 | 36785_at | 0.0477 | HSPB1 | Z23090 | |
| 31 | 38579_at | 0.0476 | R39953_1 | AC005622 | |
| 32 | 32931_at | 0.0476 | | AL050053 | |
| 33 | 37240_at | 0.0474 | HARSL | U18937 | |
| 34 | 41286_at | 0.0474 | TACSTD2 | X77753 | |
| 35 | 431_at | 0.0472 | SCYB10 | X02530 | |
| 36 | 34937_at | 0.0472 | DEFB | AF064019 | |
| 37 | 33170_at | 0.0471 | KIAA0962 | AB023179 | |
| 38 | 888_s_at | 0.047 | UQG-1 | M62302 | |
| 39 | 35032_at | | PDE6C | U31973 | |

Hippocampus 402, 404, 406, 408, 410, 412

Ready | NUM a) Genomic coordinates of feature 1 and feature 2 *overlap*
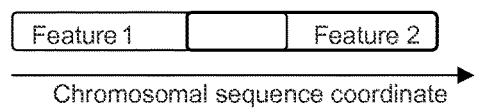
Chromosomal sequence coordinate
b) Genomic coordinates of feature 1 *include* feature 2
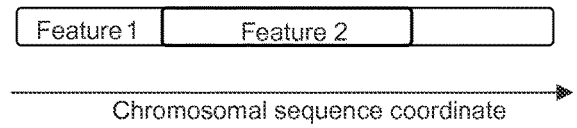
Chromosomal sequence coordinate
c) SNP X is within Regulatory Motif for Gene A
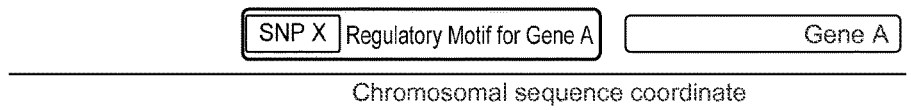
Chromosomal sequence coordinate
Figure 6

| 952 Rank | 954 Imported ID | 956 Mapped To | 958 Symbol | 960 p-value | 962 fold change | |
|---|---|---|---|---|---|---|
| 1 | 203029_s_at | 5799 | PTPRN2 | 0.0032 | 140.7 | |
| 2 | 203030_s_at | 5799 | PTPRN2 | 6.49E-05 | 91.93 | |
| 3 | 206172_at | 3598 | IL13RA2 | 0.00825 | 44.63 | |
| 4 | 200665_s_at | 6678 | SPARC | 3.02E-04 | 34.89 | |
| 5 | 206785_s_at | 3822 | KLRC2 | 0.00149 | 31.45 | |
| 6 | 202947_s_at | 2995 | GYPC | 5.70E-05 | 12.92 | |
| 7 | 217388_s_at | 8942 | KYNU | 0.00269 | 12.08 | |
| 8 | 219249_s_at | 60681 | FKBP10 | 0.00205 | 8.517 | |
| 9 | 205767_at | 2069 | EREG | 0.00277 | 8.492 | |
| 10 | 201787_at | 2192 | FBLN1 | 0.0051 | 7.175 | |
| 11 | 201645_at | 3371 | TNC | 0.00497 | 6.811 | Stop1 |
| 12 | 220374_at | 54813 | BTBD5 | 0.00239 | 6.323 | |
| 13 | 213711_at | 3887 | KRTHB1 | 8.50E-04 | 5.962 | Stop2 |
| 14 | 204748_at | 5743 | PTGS2 | 0.00346 | 5.878 | |
| 15 | 201720_s_at | 7805 | LAPTM5 | 0.00869 | 5.576 | |
| 16 | 214609_at | 401 | PHOX2A | 0.00204 | 5.073 | |
| 17 | 219776_s_at | NM_018331 | | 0.001 | 5.043 | Stop3 |
| 18 | 204205_at | 60489 | APOBEC3G | 0.00312 | 4.985 | Stop4 |
| 19 | 214833_at | 9725 | TMEM63A | 0.00858 | 4.724 | |
| 20 | 213194_at | 6091 | ROBO1 | 0.001 | 4.622 | |
| 21 | 212190_at | 5270 | SERPINE2 | 0.00106 | 4.401 | |
| 22 | 210145_at | 5321 | PLA2G4A | 0.00945 | 4.38 | Stop5 |
| 23 | 220217_x_at | 64663 | SPANXC | 0.00231 | 4.361 | |
| 24 | 216268_s_at | 182 | JAG1 | 0.00189 | 4.275 | |
| 25 | 220922_s_at | 30014 | SPANXA1 | 0.00447 | 4.226 | |
| 26 | 201417_at | AL136179 | | 0.00231 | 4.215 | |
| 27 | 213669_at | 23149 | FCHO1 | 1.18E-05 | 4.165 | |
| 28 | 201288_at | 397 | ARHGDIB | 0.00101 | 4.084 | |
| 29 | 220819_at | 79981 | FRMD1 | 7.96E-04 | 4.042 | |
| 30 | 215805_at | 23517 | SKIV2L2 | 0.00962 | 4.036 | |
| 31 | 213428_s_at | 1291 | COL6A1 | 0.00883 | 4.002 | Stop6 |
| 32 | 33304_at | 3669 | ISG20 | 0.00324 | 3.979 | |
| 33 | 201069_at | 4313 | MMP2 | 0.00887 | 3.638 | |
| 34 | 213802_at | 8492 | PRSS12 | 0.00634 | 3.163 | |

Figure 9B

|              | F1   |              | F2   |              |
|              | Rank |              | Rank |              |
| Stop 1 F1(1) | 1    |              | 1    |              |
|              | 2    |              | 2    | Stop 1 F2(1) |
|              | 3    |              | 3    |              |
|              | 4    |              | 4    |              |
| Stop 2 F1(2) | 5    |              | 5    |              |
|              | 6    |              | 6    |              |
|              | 7    |              | 7    | Stop 2 F2(2) |
|              | 8    |              | 8    |              |
|              | 9    |              | 9    |              |
|              | 10   |              | 10   |              |
| Stop 3 F1(3) | 11   |              | 11   |              |
|              | 12   |              | 12   |              |
|              | 13   |              | 13   | Stop 3 F2(3) |
|              | 14   |              | 14   |              |
|              | 15   |              | 15   |              |
|              | 16   |              | 16   |              |
|              | 17   |              | 17   |              |
| Stop 4 F1(4) | 18   |              | 18   |              |
| Stop 5 F1(5) | 19   |              | 19   |              |
|              | 20   |              | 20   |              |
|              | 21   |              | 21   |              |
|              | 22   |              | 22   |              |
|              | 23   |              | 23   |              |
|              | 24   |              | 24   |              |
|              | 25   |              | 25   |              |
|              | 26   |              | 26   |              |
|              | 27   |              | 27   | Stop 4 F2(4) |
|              | 28   |              | 28   |              |
|              | 29   |              | 29   |              |
|              | 30   |              | 30   |              |
|              | 31   |              | 31   | Stop 5 F2(5) |
|              | 32   |              | 32   |              |
|              | 33   |              | 33   |              |
| Stop 6 F1(6) | 34   |              | 34   |              |
|              | 35   |              | 35   |              |
|              | 36   |              | 36   |              |
|              | 37   |              | 37   |              |
|              | 38   |              | 38   |              |
|              | 39   |              | 39   |              |
|              | 40   |              | 40   | Stop 6 F2(6) |

SYSTEM AND METHOD FOR SCIENTIFIC INFORMATION KNOWLEDGE MANAGEMENT

CROSS REFERENCE TO RELATED APPLICATIONS

This application is a divisional of and claims priority to U.S. patent application Ser. No. 11/641,539, filed Dec. 18, 2006, which claims the benefit of priority under 35 USC § 119(e) to U.S. Provisional Patent Application No. 60/750,829, filed Dec. 16, 2005, all of which is incorporated herein by this reference for all purposes.

BACKGROUND OF THE INVENTION

The present invention relates generally to methods, systems and apparatus for storing and retrieving biological, chemical and medical information. Research in these fields has increasingly shifted from the laboratory bench to computer-based methods. Public sources such as NCBI (National Center for Biotechnology Information), for example, provide databases with genetic and molecular data. Between these and private sources, an enormous amount of data is available to the researcher from various assay platforms, organisms, data types, etc. As the amount of biomedical information disseminated grows, researchers need fast and efficient tools to quickly assimilate new information and integrate it with pre-existing information across different platforms, organisms, etc. Researchers also need tools to quickly navigate through and analyze diverse types of information.

SUMMARY OF THE INVENTION

The present invention relates to methods, systems and apparatus for capturing, integrating, organizing, navigating and querying large-scale data from high-throughput biological and chemical assay platforms. It provides a highly efficient meta-analysis infrastructure for performing research queries across a large number of studies and experiments from different biological and chemical assays, data types and organisms, as well as systems to build and add to such an infrastructure.

One aspect of the invention relates to a Knowledge Base that may be used to store and query diverse types of biological, chemical and medical information. According to various embodiments of the invention, the Knowledge Base includes Feature Sets. A Feature Set is a "derived" data set from the "raw data" taken from one or more experiments on one or more samples. A Feature Set includes one or more features (typically a plurality of features) and associated information about the impact of the experiment(s) on those features. In certain embodiments, features in a Feature Set are ranked. The rankings indicate the relative significance of the features in response to the experiment or measurement. The Knowledge Base may also include Feature Groups, which contain features related to one another in some way. As an example, the members of a Feature Group may all belong to the same signaling pathway or share a common structural feature. According to various embodiments, other parts of a Knowledge Base include a Scoring Table, which is a table that contains information about the correlation of a Feature Set to other Feature Sets or Feature Groups. For example, Feature Sets containing many of the same genes may be highly correlated as reflected in the Scoring Table information. In certain embodiments, the correlation information takes into account feature rankings Another element of the Knowledge Base is an Index Set containing unique names or identifiers for 'features' (e.g., genes, sequences, proteins, compounds, etc.) in the Knowledge Base. The Index Set may also contain a list of synonyms, genomic coordinates, etc., that may be used to efficiently look up and associate features imported by a user with the unique identifiers stored in the Index Set. Also in certain embodiments, a Knowledge Base includes a taxonomy, which includes a list or hierarchical structure of 'tags'-standard biological, chemical or medical key concepts and terms that may be associated with Feature Sets in the Knowledge Base.

Another aspect of the invention relates to methods of producing or generating a Knowledge Base. In certain embodiments, the methods involve importing and preprocessing data for use in later queries that may be run by a user. Many of the importing and preprocessing operations are performed automatically. In certain embodiments, importing includes importing a Feature Set to a system, tagging the imported Feature Sets with relevant standard biomedical or chemical terms, ranking features within a Feature Set and mapping features to globally unique identifiers or names for the features. Preprocessing involves correlating Feature Sets with other Feature Sets and Feature Groups in the Knowledge Base (typically with all other Feature Sets and Feature Groups) and generating a correlation score that is used in providing results to user queries. Producing a Knowledge Base may also include a curation operation in which one or more Feature Sets are generated from raw data.

Another aspect of the invention relates to queries. In certain embodiments, a query involves (i) designating specific content that is to be compared and/or analyzed against (ii) other content in a "field of search" to generate (iii) a query result in which content from the field of search is selected and/or ranked based upon the comparison. The field of search may include some or all of a Knowledge Base storing content such as Feature Sets and Feature Groups. As examples, types of queries where designated content is compared against content in a field of search include Feature Set queries, Feature Group queries, and feature-specific queries.

In certain embodiments, the invention pertains to methods and user interfaces for inputting and running queries as well as presenting query results. In certain embodiments, a user interface is provided with regions for users to (1) locate potential content for the query, (2) input or select content for query, and (3) limit a field of search within a library or Knowledge Base containing relevant content.

These and other features and advantages of the invention will be described in more detail below with reference to the drawings.

BRIEF DESCRIPTION OF THE DRAWINGS

FIG. 4 is a screen display showing an example of a Feature Set file.

FIG. 6 shows schematic representations showing examples of relationships between features. Mapping is used to establish connections between related features in accordance with various embodiments of the present invention.

FIG. 9B is an example of a feature table of a Feature Set that may be correlated to a Feature Group. Stop or checkpoints used in a correlation process are shown on the diagram.

FIG. 11B is a representation of features lists of two Feature Sets (F1 and F2) that are to be correlated to one another. Stop or checkpoints used in a correlation process are shown on the diagram.

FIG. 13C is a screen shot depicting a query results window for a Feature Set versus Feature Groups query.

DETAILED DESCRIPTION OF THE PREFERRED EMBODIMENTS

1. Introduction and Relevant Terminology

Figure 1:
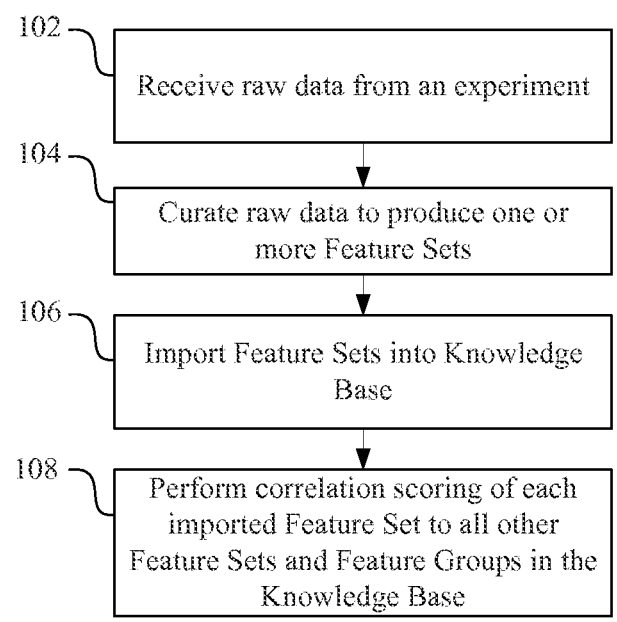
FIG. 1 is a flow diagram presenting key steps employed to generate a Knowledge Base in accordance with one embodiment of the present invention.

The present invention relates to methods, systems and apparatus for capturing, integrating, organizing, navigating and querying large-scale data from high-throughput biological and chemical assay platforms. It provides a highly efficient meta-analysis infrastructure for performing research queries across a large number of studies and experiments from different biological and chemical assays, data types and organisms, as well as systems to build and add to such an infrastructure.

While most of the description below is presented in terms of systems, methods and apparatuses that integrate and allow exploration of data from biological experiments and studies, the invention is by no means so limited. For example, the invention covers chemical and clinical data. In the following description, numerous specific details are set forth in order to provide a thorough understanding of the present invention. It will be apparent, however, that the present invention may be practiced without limitation to some of the specific details presented herein.

The following terms are used throughout the specification. The descriptions are provided to assist in understanding the specification, but do not necessarily limit the scope of the invention.

Raw Data—

This is the data from one or more experiments that provides information about one or more samples. Typically, raw data is not yet processed to a point suitable for use in the databases and systems of this invention. Subsequent manipulation reduces it to the form of one or more "Feature Sets" suitable for use in such databases and systems. The process of converting the raw data to Feature Sets is sometimes referred to as curation.

Most of the examples presented herein concern biological experiments in which a stimulus acts on a biological sample such as a tissue or cell culture. Often the biological experiment will have associated clinical parameters such as tumor stage, patient history, etc. The invention is not however limited to biological samples and may involve, for example, experiments on non-biological samples such as chemical compounds, various types of synthetic and natural materials, etc. and their effects on various types of assays (e.g., cancer cell line progression).

Whether working with biological or non-biological samples, the sample may be exposed to one or more stimuli or treatments to produce test data. Control data may also be produced. The stimulus is chosen as appropriate for the particular study undertaken. Examples of stimuli that may be employed are exposure to particular materials or compositions, radiation (including all manner of electromagnetic and particle radiation), forces (including mechanical (e.g., gravitational), electrical, magnetic, and nuclear), fields, thermal energy, and the like. General examples of materials that may be used as stimuli include organic and inorganic chemical compounds, biological materials such as nucleic acids, carbohydrates, proteins and peptides, lipids, various infectious agents, mixtures of the foregoing, and the like. Other general examples of stimuli include non-ambient temperature, non-ambient pressure, acoustic energy, electromagnetic radiation of all frequencies, the lack of a particular material (e.g., the lack of oxygen as in ischemia), temporal factors, etc. As suggested, a particularly important class of stimuli in the context of this invention is exposure to therapeutic agents (including agents suspected of being therapeutic but not yet proven to have this property). Often the therapeutic agent is a chemical compound such as a drug or drug candidate or a compound present in the environment. The biological impact of chemical compounds is manifest as a change in a feature such as a level of gene expression or a phenotypic characteristic.

As suggested, the raw data will include "features" for which relevant information is produced from the experiment. In many examples the features are genes or genetic information from a particular tissue or cell sample exposed to a particular stimulus.

A typical biological experiment determines expression or other information about a gene or other feature associated with a particular cell type or tissue type. Other types of genetic features for which experimental information may be collected in raw data include SNP patterns (e.g., haplotype blocks), portions of genes (e.g., exons/introns or regulatory motifs), regions of a genome of chromosome spanning more than one gene, etc. Other types of biological features include phenotypic features such as the morphology of cells and cellular organelles such as nuclei, Golgi, etc. Types of chemical features include compounds, metabolites, etc.

The raw data may be generated from any of various types of experiments using various types of platforms (e.g., any of a number of microarray systems including gene microarrays, SNP microarrays and protein microarrays, cell counting systems, High-Throughput Screening ("HTS") platforms, etc.). For example, an oligonucleotide microarray is also used in experiments to determine expression of multiple genes in a particular cell type of a particular organism. In another example, mass spectrometry is used to determine abundance of proteins in samples.

Feature Set—

This refers to a data set derived from the "raw data" taken from one or more experiments on one or more samples. The Feature Set includes one or more features (typically a plurality of features) and associated information about the impact of the experiment(s) on those features. At some point, the features of a Feature Set may be ranked (at least temporarily) based on their relative levels of response to the stimulus or treatment in the experiment(s) or based on their magnitude and direction of change between different phenotypes, as well as their ability to differentiate different phenotypic states (e.g., late tumor stage versus early tumor stage).

For reasons of storage and computational efficiency, for example, the Feature Set may not include information about many features contained in the raw data. As indicated, a process such as curation converts raw data to Feature Sets.

Typically the Feature Set pertains to raw data associated with a particular question or issue (e.g., does a particular chemical compound interact with proteins in a particular pathway). Depending on the raw data and the study, the Feature Set may be limited to a single cell type of a single organism. From the perspective of a "directory," a Feature Set belongs to a "study." In other words, a single study may include one or more Feature Sets.

In many embodiments, the Feature Set is either a "bioset" or a "chemset." A bioset typically contains data providing information about the biological impact of a particular stimulus or treatment. The features of a bioset are typically units of genetic or phenotypic information as presented above. These are ranked based on their level of response to the stimulus (e.g., a degree of up or down regulation in expression), or based on their magnitude and direction of change between different phenotypes, as well as their ability to differentiate different phenotypic states (e.g., late tumor stage versus early tumor stage). A chemset typically contains data about a panel of chemical compounds and how they interact with a sample, such as a biological sample. The features of a chemset are typically individual chemical compounds or concentrations of particular chemical compounds. The associated information about these features may be EC50 values, IC50 values, or the like.

A Feature Set typically includes, in addition to the identities of one or more features, statistical information about each feature and possibly common names or other information about each feature. A Feature Set may include still other pieces of information for each feature such as associated description of key features, user-based annotations, etc. The statistical information may include p-values of data for features (from the data curation stage), "fold change" data, and the like. A fold change indicates the number of times (fold) that expression is increased or decreased in the test or control experiment (e.g., a particular gene's expression increased "4-fold" in response to a treatment). A Feature Set may also contain features that represent a "normal state", rather than an indication of change. For example, a Feature Set may contain a set of genes that have "normal and uniform" expression levels across a majority of human tissues. In this case, the Feature Set would not necessarily indicate change, but rather a lack thereof.

In certain embodiments, a rank is ascribed to each feature, at least temporarily. This may be simply a measure of relative response within the group of features in the Feature Set. As an example, the rank may be a measure of the relative difference in expression (up or down regulation) between the features of a control and a test experiment. In certain embodiments, the rank is independent of the absolute value of the feature response. Thus, for example, one Feature Set may have a feature ranked number two that has a 1.5 fold increase in response, while a different Feature Set has the same feature ranked number ten that has a 5 fold increase in response to a different stimulus.

Feature Group—

This refers to a group of features (e.g., genes) related to one another. As an example, the members of a Feature Group may all belong to the same protein pathway in a particular cell or they may share a common function or a common structural feature. A Feature Group may also group compounds based on their mechanism of action or their structural/binding features.

Index Set—

The Index Set is a set in the Knowledge Base that contains feature identifiers and mapping identifiers and is used to map all features of the Feature Sets imported to Feature Sets and Feature Groups already in the Knowledge Base. For example, the Index Set may contain several million feature identifiers pointing to several hundred thousand mapping identifiers. Each mapping identifier (in some instances, also referred to as an address) represents a unique feature, e.g., a unique gene in the mouse genome. In certain embodiments, the Index Set may contain diverse types of feature identifiers (e.g., genes, genetic regions, etc.), each having a pointer to a unique identifier or address. The Index Set may be added to or changed as new knowledge is acquired.

Knowledge Base—

This refers to a collection of data used to analyze and respond to queries. In certain embodiments, it includes one or more Feature Sets, Feature Groups, and metadata for organizing the Feature Sets in a particular hierarchy or directory (e.g., a hierarchy of studies and projects). In addition, a Knowledge Base may include information correlating Feature Sets to one another and to Feature Groups, a list of globally unique terms or identifiers for genes or other features, such as lists of features measured on different platforms (e.g., Affymetrix human HG_U133A chip), total number of features in different organisms, their corresponding transcripts, protein products and their relationships. A Knowledge Base typically also contains a taxonomy that contains a list of all tags (keywords) for different tissues, disease states, compound types, phenotypes, cells, as well as their relationships. For example, taxonomy defines relationships between cancer and liver cancer, and also contains keywords associated with each of these groups (e.g., a keyword "neoplasm" has the same meaning as "cancer"). Typically, though not necessarily, at least some of the data in the Knowledge Base is organized in a database.

Curation—

Curation is the process of converting raw data to one or more Feature Sets (or Feature Groups). In some cases, it greatly reduces the amount of data contained in the raw data from an experiment. It removes the data for features that do not have significance. In certain embodiments, this means that features that do not increase or decrease significantly in expression between the control and test experiments are not included in the Feature Sets. The process of curation identifies such features and removes them from the raw data. The curation process also identifies relevant clinical questions in the raw data that are used to define Feature Sets. Curation also provides the Feature Set in an appropriate standardized format for use in the Knowledge Base.

Data Import—

Data import is the process of bringing Feature Sets and Feature Groups into a Knowledge Base or other repository in the system, and is an important operation in building a Knowledge Base. A user interface may facilitate data input by allowing the user to specify the experiment, its association with a particular study and/or project, and an experimental platform (e.g., an Affymetrix gene chip), and to identify key concepts with which to tag the data. In certain embodiments, data import also includes automated operations of tagging data, as well as mapping the imported data to data already in the system. Subsequent "preprocessing" (after the import) correlates the imported data (e.g., imported Feature Sets and/or Feature Groups) to other Feature Sets and Feature Groups.

Preprocessing—

Preprocessing involves manipulating the Feature Sets to identify and store statistical relationships between pairs of Feature Sets in a Knowledge Base. Preprocessing may also involve identifying and storing statistical relationships between Feature Sets and Feature Groups in the Knowledge Base. In certain embodiments, preprocessing involves correlating a newly imported Feature Set against other Feature Sets and against Feature Groups in the Knowledge Base. Typically, the statistical relationships are pre-computed and stored for all pairs of different Feature Sets and all combinations of Feature Sets and Feature Groups, although the invention is not limited to this level of complete correlation.

In one embodiment, the statistical correlations are made by using rank-based enrichment statistics. For example, a rank-based iterative algorithm that employs an exact test is used in certain embodiments, although other types of relationships may be employed, such as the magnitude of overlap between Feature Sets. Other correlation methods known in the art may also be used.

As an example, a new Feature Set input into the Knowledge Base is correlated with every other (or at least many) Feature Sets already in the Knowledge Base. The correlation compares the new Feature Set and the Feature Set under consideration on a feature-by-feature basis by comparing the rank or other information about matching genes. A rank-based iterative algorithm is used in one embodiment to correlate the Feature Sets. The result of correlating two Feature Sets is a "score." Scores are stored in the Knowledge Base and used in responding to queries.

Study/Project/Library—

This is a hierarchy of data containers (like a directory) that may be employed in certain embodiments. A study may include one or more Feature Sets obtained in a focused set of experiments (e.g., experiments related to a particular cardiovascular target). A project includes one or more studies (e.g., the entire cardiovascular effort within a company). The library is a collection of all projects in a Knowledge Base. The end user has flexibility in defining the boundaries between the various levels of the hierarchy.

Tag—

A tag associates descriptive information about a Feature Set with the Feature Set. This allows for the Feature Set to be identified as a result when a query specifies or implicates a particular tag. Often clinical parameters are used as tags. Examples of tag categories include tumor stage, patient age, sample phenotypic characteristics and tissue types.

Mapping—

Mapping takes a feature (e.g., a gene) in a Feature Set and maps it to a globally unique mapping identifier in the Knowledge Base. For example, two sets of experimental data used to create two different Feature Sets may use different names for the same gene. Often herein the Knowledge Base includes an encompassing list of globally unique mapping identifiers in an Index Set. Mapping uses the Knowledge Base's globally unique mapping identifier for the feature to establish a connection between the different feature names or IDs. In certain embodiments, a feature may be mapped to a plurality of globally unique mapping identifiers. In an example, a gene may also be mapped to a globally unique mapping identifier for a particular genetic region. Mapping allows diverse types of information (i.e., different features, from different platforms, data types and organisms) to be associated with each other. There are many ways to map and some of these will be elaborated on below. One involves the search of synonyms of the globally unique names of the genes. Another involves a spatial overlap of the gene sequence. For example, the genomic or chromosomal coordinate of the feature in a Feature Set may overlap the coordinates of a mapped feature in an Index Set of the Knowledge Base. Another type of mapping involves indirect mapping of a gene in the Feature Set to the gene in the Index Set. For example, the gene in an experiment may overlap in coordinates with a regulatory sequence in the Knowledge Base. That regulatory sequence in turn regulates a particular gene. Therefore, by indirect mapping, the experimental sequence is indirectly mapped to that gene in the Knowledge Base. Yet another form of indirect mapping involves determining the proximity of a gene in the Index Set to an experimental gene under consideration in the Feature Set. For example, the experimental feature coordinates may be within 100 basepairs of a Knowledge Base gene and thereby be mapped to that gene.

Correlation—

As an example, a new Feature Set input into the Knowledge Base is correlated with every other (or at least many) Feature Sets already in the Knowledge Base. The correlation compares the new Feature Set and the Feature Set under consideration on a feature-by-feature basis comparing the rank or other information about matching genes. A ranked based running algorithm is used in one embodiment (to correlate the Feature Sets). The result of correlating two Feature Sets is a "score." Scores are stored in the Knowledge Base and used in responding to queries about genes, clinical parameters, drug treatments, etc.

Correlation is also employed to correlate new Feature Sets against all Feature Groups in the Knowledge Base. For example, a Feature Group representing "growth" genes may be correlated to a Feature Set representing a drug response, which in turn allows correlation between the drug effect and growth genes to be made.

2. Producing a Knowledge Base

Aspects of the present invention relate to producing and navigating a Knowledge Base—a database of diverse types of biological, chemical and/or medical information. The following description presents one preferred process by which data for a Knowledge Base according to the present invention may be obtained. FIG. 1 shows an overview of the process of producing a Knowledge Base; FIGS. 2-11C describe aspects of the process in greater detail.

In one embodiment, the Knowledge Base contains Feature Sets and Feature Groups from a number of sources, including data from external sources, such as public databases, including the National Center for Biotechnology Information (NCBI). In addition, proprietary data obtained and processed by the database developer or user is generally used.

FIG. 1 shows an overview of the process of producing a Knowledge Base. The process begins with receiving raw data from a particular experiment or study (102). The raw data may be obtained from a public database, private sources, an individual experiment run in a lab, etc. The raw data typically contains information for control and test samples. For example, in a gene expression study of lung cancer, the raw data includes expression profiles for normal (control) and tumor (test) lung cells. The raw data from the study or experiment may contain additional information, e.g., the gene expression profiles may also be associated with a particular disease state, or with patients having different clinical parameters (age, gender, smoker/non-smoker, etc.). Once the raw data is received, it is curated to produce one or more Feature Sets (104). A Feature Set is a set of features identified as being significant in a given experimental setting and associated statistical information. For example, the features of one Feature Set from the lung cancer gene expression study would be the set of genes that are differentially expressed between tumor and normal cells. Associated statistical information might indicate the fold change or a p-value associated with each feature, representing the change of the feature between the experimental and control conditions. Feature Sets are generated from a particular study or experiment and are imported into the Knowledge Base (106). As described below, importing the data typically involves tagging the Feature Set with appropriate biomedical or chemical terms, as well as automatically mapping each feature in a Feature Set, i.e., establishing connections between each imported feature and other appropriate features in the Knowledge Base as appropriate. The next major operation in producing a Knowledge Base is correlation scoring of each imported Feature Set with all other Feature Sets and Feature Groups in the Knowledge Base (108). After correlation scoring, the correlation, e.g., in the form of a p-value, of a Feature Set with all other Feature Sets and all Feature Groups is known and stored.

Once the process in FIG. 1 is performed, the user is able, by submitting queries and navigating, to efficiently explore and connect biological information contained in the Knowledge Base. The process illustrated in FIG. 1 may be performed anytime a user wishes to add experimental data to the Knowledge Base.

A. Curating

Figure 2A:
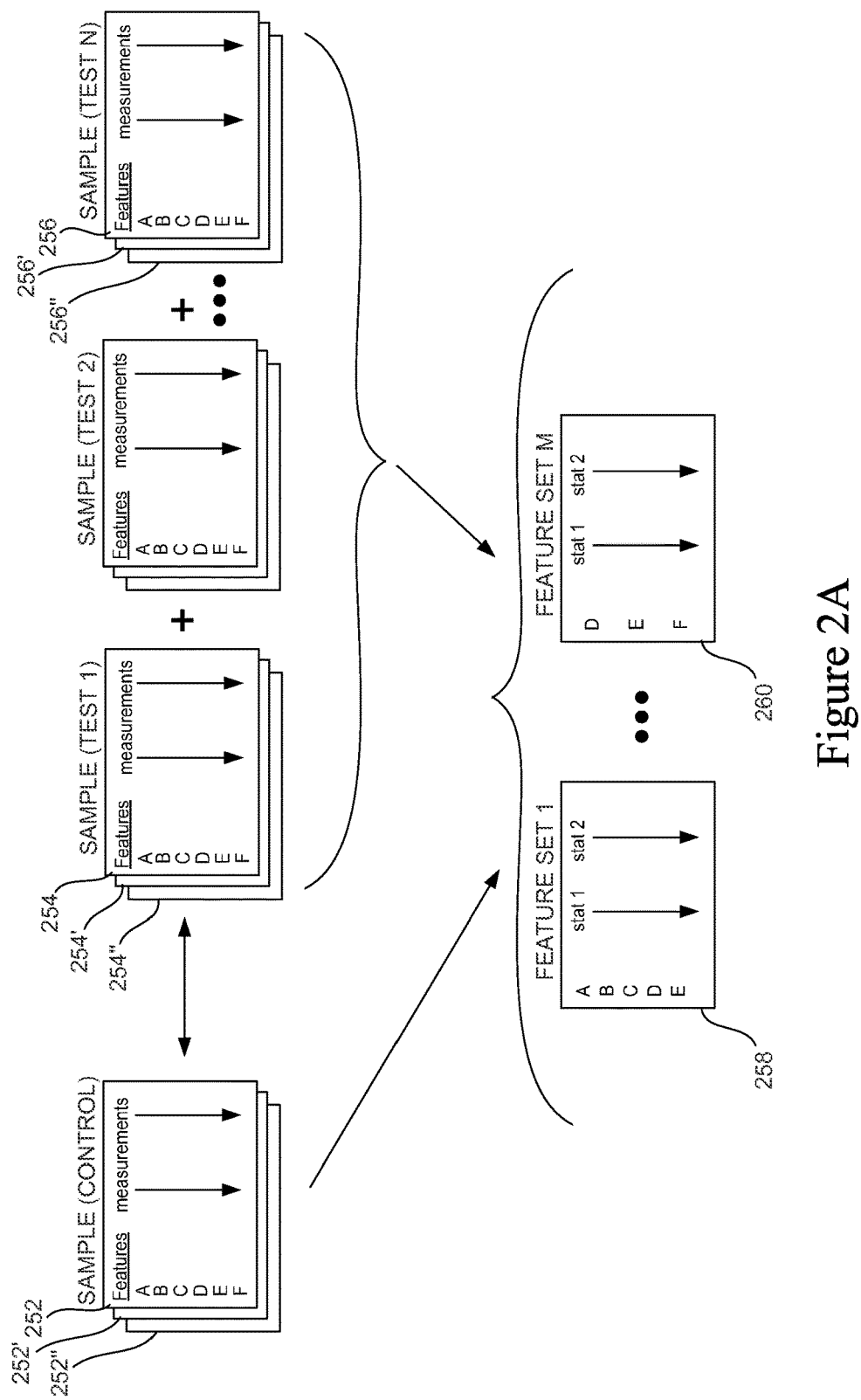
FIG. 2A is a schematic representation of raw data and data sets (Feature Sets) generated from raw data for use in a Knowledge Base.

As indicated above, curation is the process of generating Feature Sets from raw data. FIG. 2A presents a graphical representation of raw data and the resulting Feature Sets. Raw data includes the data for control and test samples; in the example depicted in FIG. 2A, data 252 includes measurements (e.g., intensity measurements from a microarray) for features A-F. Typically, the data includes replicate data; here the control sample replicates are indicated as data 252' and 252". One experiment typically contains multiple test samples. Test sample data is shown in the figure as Sample (test 1) data (254 and replicates 254' and 254"), test 2 data, . . . test N (256 and replicates 256' and 256"), each with identified features and associated statistics. In the simplest case there is only one test and one control sample (each typically having one or more replicates). More typically, there will be multiple test samples. In one example, each test sample represents a different concentration of a potential therapeutic compound. In another example, each test sample represents a tissue sample taken from a patient with a different clinical indication (e.g., lung tissue samples from non-smokers, from smokers of various levels, from drivers of diesel vehicles, from patients before treatment administration and after, etc.).

The samples from which raw data is generated typically contain many different types of information, especially when it comes to clinical samples. For example, raw data from an experiment measuring differential gene expression between tumors of different patients—e.g., in tumor stage 1 and tumor stage 2 cells—may also contain information on other attributes of those patients in this example, beyond whether they are tumor stage 1 or tumor stage 2, e.g., whether they are smokers, their age, their prior treatment, year of diagnosis, etc.

The curation process generates one or more Feature Sets, which are shown in the example depicted in the figure as Feature Set 1 (258) to Feature Set M (260). Feature Sets contain statistics derived from measurements in the raw data. In the figure, these are labeled stat 1 and stat 2, e.g., a p-value and a fold change. P-values generally refer to the probability of obtaining a result at least as extreme as that obtained and are one type of data that may be in the raw data. Fold change typically refers to the magnitude of change (2-fold, 3-fold, etc.) of some measurement in control and test samples. Each Feature Set relates to a different biological, clinical, or chemical question (e.g., up-regulation in response to compound treatment; up-regulation in a particular tissue, etc.). Hence each Feature Set may have a different collection of features as only features identified in curation as statistically relevant to a given question are included in a particular Feature Set. For example, Feature Set 1 in FIG. 2A contains features A-E and Feature Set M contains features D, E and F. Similarly, each Feature Set may contain different associated statistical measures as appropriate for the set. The depiction of raw data in FIG. 2A is merely an example of how raw data may be presented.

Figure 2B:
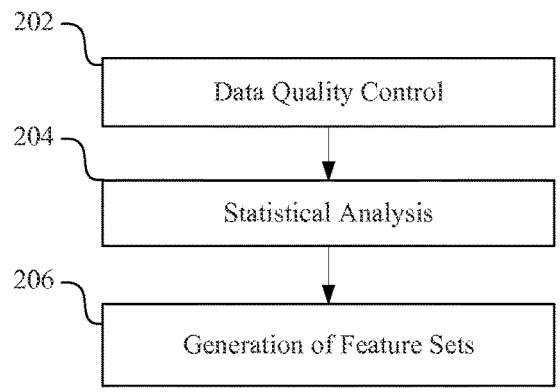
FIG. 2B is a flow diagram presenting key steps employed in curating raw data in accordance with one embodiment of the present invention.
Figure 2C:
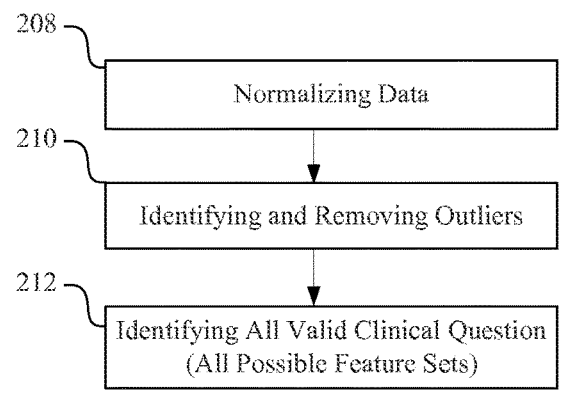
FIG. 2C is flow diagram presenting key steps employed in a data quality control operation of a curating process in accordance with one embodiment of the present invention.

FIG. 2B is a process flowsheet that depicts an overview of a curation process. The process begins with data quality control (202). Data quality control is an operation that includes normalizing the data, removing outlying data and identifying all valid clinical questions (i.e., identifying all possible Feature Sets). FIG. 2C presents a process flowsheet showing operations in one embodiment of a data quality control process. The process begins with normalizing the data (208). Normalization strategies for various types of data are well-known in the art. Any appropriate normalization strategy may be used. Outliers are then identified and removed (210). This is typically performed on a per sample basis (i.e., outlying samples are removed). Standardized processes for identifying outliers are also well-known. Once the data is normalized and the outliers are removed, valid clinical questions associated with the experiment are identified (212). In certain embodiments, this is tantamount to identifying possible Feature Sets. In one example, genes for proteins in one pathway comprise features for a first Feature set and genes for proteins in a different pathway comprise features for a different Feature set. In this case, the clinical questions defining the Feature Sets pertain to the impact of a particular stimulus or treatment on features measured, ultimately identifying genes in two distinct cellular pathways. In many cases, clinical question are questions that the experiment was designed to answer or measure. This may be designated as a valid clinical question, and the related Feature Set would contain the features for which there is a statistically significant difference between control and test sample. (The features in each Feature Set are typically determined in the subsequent statistical analysis operation described below). Valid clinical questions may also be questions that the experiment was not necessarily designed for, but that the raw data gathered supports. For example, an experiment may be designed to compare tumor stage 1 and tumor stage 2 samples, with the data published with associated clinical annotations that show Her2-positive patients and Her2-negative patients. One Feature Set may be up-regulation of genes in tumor stage 2 versus tumor stage 1 samples (i.e., the Feature Set contains genes that are up-regulated in tumor stage 2 samples) and another Feature Set may be up-regulation of genes in Her2-positive versus Her2-negative patients (i.e., the Feature Set contains genes that are up-regulated in Her2-positive patients). A clinical question may be deemed "valid" if there is enough statistically significant data to support the clinical comparison.

In many cases, the raw data contains features that can be associated with a large number of different clinical parameters or attributes of the patient, e.g., smoker/non-smoker, drugs taken, age, tumor stage, etc. Identifying valid clinical questions involves determining if any differences in features for two groups of data (e.g., smoker versus non-smoker) is statistically significant. Identifying valid clinical questions may be performed by any appropriate methodology, including brute force methods and more sophisticated methods. For example, a multi-ANOVA type analysis may be performed on the entire raw data set containing different clinical parameters to find which parameters have a statistically significant effect on differential gene expression (or other change in measured features). In certain embodiments, clustering may be applied to data to, e.g., compare samples of clusters of data groups to see if statistically significant comparisons of groups that may be used to generate Feature Sets are present.

Figure 2D:
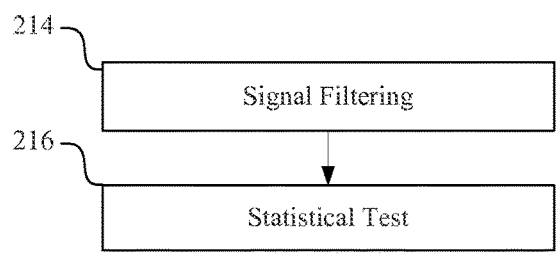
FIG. 2D is a flow diagram presenting key steps employed in a statistical analysis operation of a curating process in accordance with one embodiment of the present invention.

Returning to FIG. 2B, once the valid clinical questions have been identified, statistical analysis is performed to obtain statistical measures such as p-value, fold change, and other relevant statistical/measurement information. FIG. 2D shows an overview of one statistical analysis process. The process starts with signal filtering (214), an operation in which features whose corresponding signals are below a threshold intensity (or other measurement) are filtered out. For example, fluorescent signals from a microarray are analyzed on a gene-by-gene basis with signals below a threshold filtered out. In this manner, a reduced set of genes is generated. One or more statistical tests are then performed on a feature-by-feature basis to determine for what features the differential measurement between control and test is significant enough to include the feature in the Feature Set.

Returning to FIG. 2B, after the clinical questions/possible Feature Sets are identified (in a Data QC operation 202) and the features and associated statistics that make up each Feature Set are identified (in a Statistical Analysis operation 204), the Feature Sets are generated (206). At this point (post-curation, pre-importation), the Feature Sets typically contain a name and a feature table, the feature table being a list of feature identifiers (e.g., names of genes) and the associated statistics. Generating a Feature Set involves putting the Feature Set into an appropriate standardized format for importation into the Knowledge Base. FIG. 4 shows an example of a Feature Set file that is ready to be imported. In this example, the Feature Set file is an Excel file. The name of the Feature Set (i.e., the clinical question) is identified at 402. In this example, it is Hippocampus: Neuroactive compound B2104-affected genes. Other descriptive information about the Feature Set is included at 404, in this case Brain (front cortex). As discussed below, this descriptive information may be used to place the Feature Set into a directory structure within the system and/or used to 'tag' the Feature Set (in order to associate it with the biomedical taxonomy structure within the Knowledge Base). Features (the genes for which the expression in the hippocampus tissue is significantly affected by the particular compound) are indicated in column 406, with their common names in column 410 and GenBank identifiers in column 412. The associated statistics, in this case p-values, are in column 408. The table shown in FIG. 4 is just an example of an appropriate format for a Feature Set.

i. Tissue-Specific Feature Sets

As indicated above, during the Statistical Analysis portion of the curation process, raw data is looked at on a feature-by-feature basis to determine if there is a statistically significant difference between control and test to include that feature in the Feature Set in question. In addition, in certain embodiments, tissue-specific Feature Sets may be generated. Tissue-specific Feature Sets are Feature Sets generated from multi-tissue experiments and contain features that show specificity for a particular tissue or tissues. For example, for an experiment measuring gene expression across twelve tissues, one generated Feature Set may be liver-specific up-regulated genes. The process is typically used with studies having a number of tissues across which a median expression is statistically relevant. In certain embodiments, tissue-specific Feature Sets are generated for studies across at least twelve tissues. For experiments across highly-related tissues, the number of tissues may be lower (e.g., four).

Figure 3A:
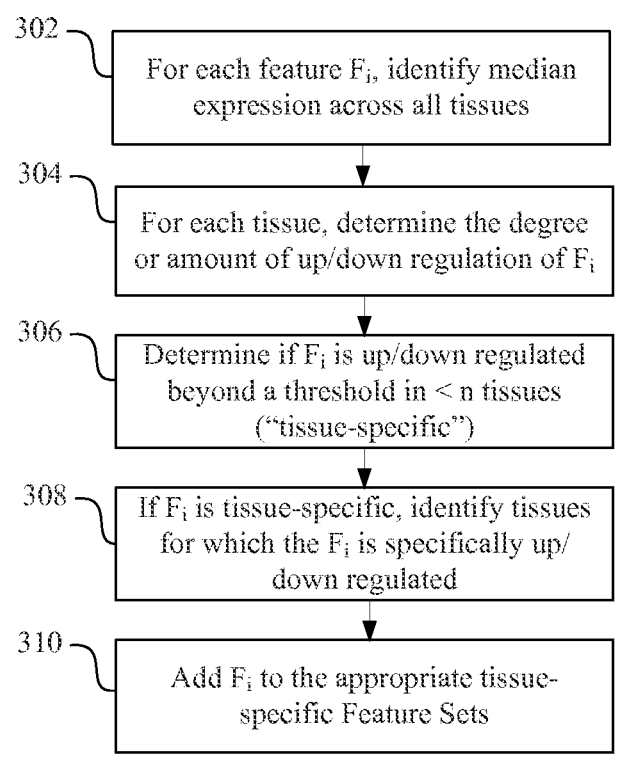
FIG. 3A is a flow diagram presenting key steps employed in generating tissue-specific Feature Sets from multi-tissue experiments or studies in accordance with one embodiment of the present invention.
Figure 3B:
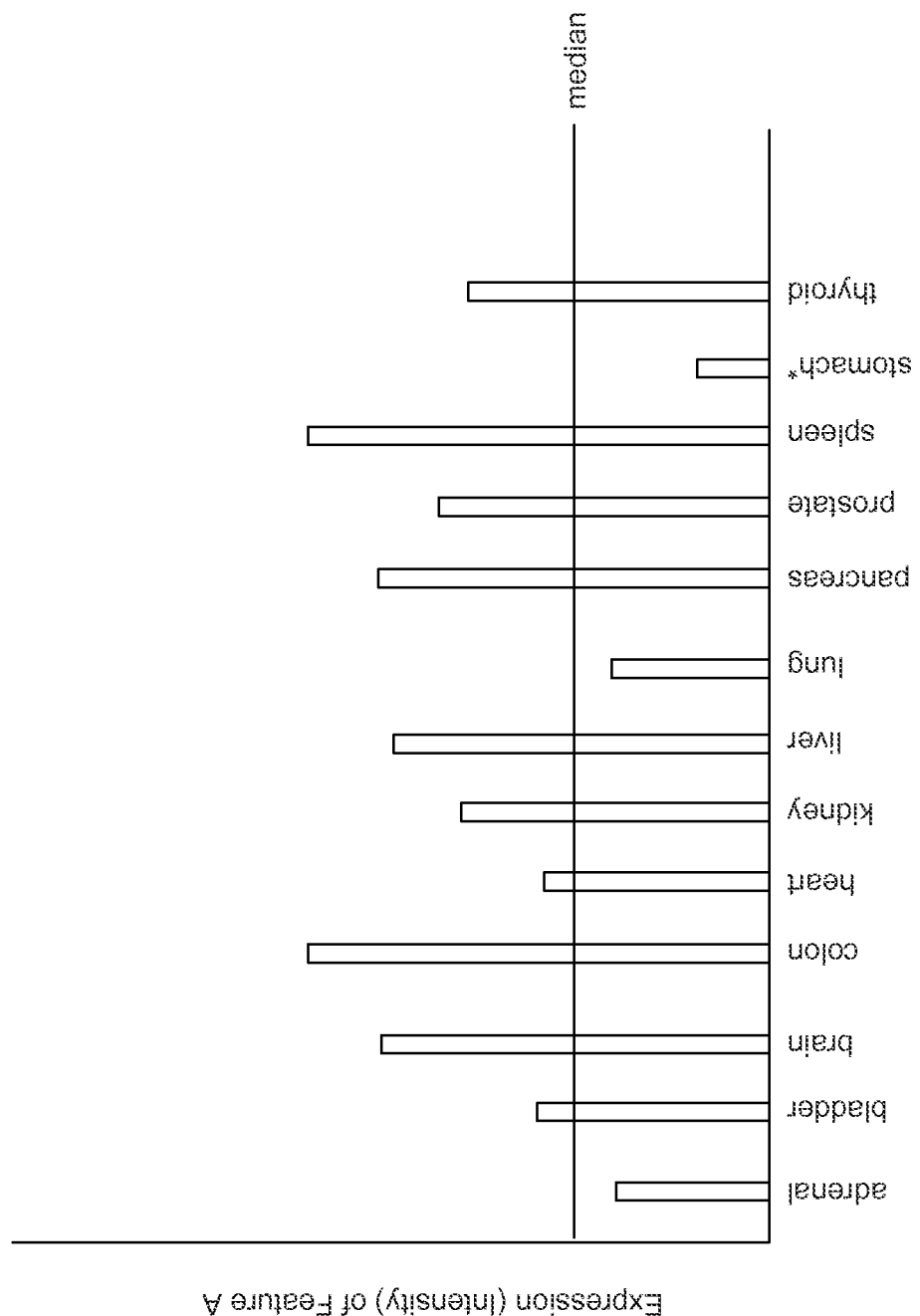
FIG. 3B is a graph illustrating median expression of a feature across multiple tissues.

FIG. 3A is a flow sheet showing a process by which tissue-specific Feature Sets are generated. The process shown in FIG. 3A is performed for each possible feature in the data set (e.g., each feature remaining in the data set after signal filtering). The process begins with identifying the median expression (or other measurement) of the feature across all tissues (302). The median expression across all samples in all tissues is used as synthetic control or normal expression of the feature in a tissue. A graphical example of a median expression of a feature across multiple features is shown in FIG. 3B. In FIG. 3B, the vertical bars indicate expression in each tissue, and the horizontal line indicates median expression across all tissues. The amount or degree of up/down regulation in each tissue relative to the median is then determined (304). It is then determined if the feature is tissue-specific or not (306). A feature is determined to be tissue-specific if it is up or down regulated beyond a threshold in no more than n tissues. For example, a threshold may be a combination of fold change of 2-fold, as well as t-test p-value of 0.05. If a feature is up-regulated by a fold change of at least 2-fold with a maximum t-test p-value of 0.05 in no more than n=3 tissues (e.g., only in liver and lung), it is considered tissue-specific. In the process shown in FIG. 3, up-regulation and down-regulation are considered separately; however, in certain embodiments, these may be considered together (e.g., a feature is determined to be tissue-specific if it is up- or down-regulated in no more than n tissues). If the feature is tissue-specific, the tissues in which the feature is specifically up/down regulated are identified (308). The feature is then added to the identified tissue-specific Feature Sets (310). In the example shown in FIG. 3B, down-regulation of feature A is tissue-specific for stomach tissue (as indicated by the asterisk), so the feature would be added to the stomach-specific down-regulation Feature Set.

It should be noted that the tissue-specific Feature Sets are typically generated for multi-tissue studies in addition to the Feature Sets generated by comparing expression between control and test as described above. Thus, if a gene is up-regulated in liver tissue, regardless of whether the up-regulation is tissue-specific or not, the gene is included in a separate Feature Set that includes genes that are up-regulated in liver.

ii. Feature Groups

As discussed above, data is arranged into Feature Sets and Feature Groups. Feature Groups contain any set of features of interest, typically without associated statistics. Examples of Feature Groups include any set of features that the researcher is interested in, a set of features that defines a biological pathway, or a set of features that defines a protein family. Curation of Feature Groups may be performed by any appropriate method. Features involved in particular pathways, or sharing common functions or common structural features may be received from public or private databases, or generated by the researcher or user. After curation, the Feature Groups typically contain a name, other descriptive information and a list of member features.

B. Importing Data

Figure 5:
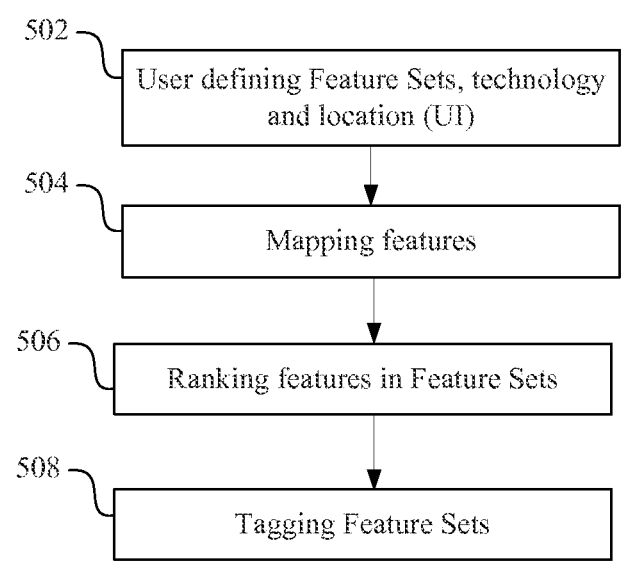
FIG. 5 is a flow diagram presenting key steps employed in importing data into a Knowledge Base in accordance with one embodiment of the present invention.

Once the data is curated and organized in Feature Sets containing lists of features and associated statistics (e.g., as show in FIG. 4) or Feature Groups containing lists of features, it is ready to be imported. The importation process involves importing the data into the system, tagging the data with standard terms that describe key concepts associated with the Feature Set or Feature Group, and establishing connections between the imported data and all other data within the system. FIG. 5 is a process flowsheet that shows an overview of the Data Importation process.

The process begins in an operation 502, in which the user defines all relevant files (all Feature Set and/or Feature Group files) as well as technology, e.g., the microarray or other platform used to generate the data and any associated information through a user interface. It should be noted that in most cases platform technology does not apply to Feature Groups, as a Feature Group typically contains a group of features related biologically and not experimentally. Associated information may include text files that contain descriptions or lists of key concepts of the Feature Set or Feature Group. A location for the Feature Set in a directory system is also typically specified. For example, the user may specify a Project directory and Study subdirectory.

The next operation in the data import process is mapping the features imported (504). Mapping is the process through which diverse features (e.g., from different platforms, data types and organisms) are associated with each other. For example, a gene may be associated with a SNP, a protein, or a sequence region of interest. During data importation, every feature is automatically mapped. In certain embodiments, mapping involves mapping each feature to one or more reference features or addresses in a globally unique mapping identifier set in the Knowledge Base (e.g., an Index Set). Mapping facilitates correlation between all Feature Sets and Feature Groups, allowing independent sets of data/information from diverse sources, assay types and platforms, to be correlated.

In certain embodiments, mapping involves the use of an Index Set that contains addresses or identifiers, each representing a unique feature (e.g., an Index Set may contain addresses or mapping identifiers representing a single gene of a human or non-human genome). Also in certain embodiments, mapping involves matching imported identifiers (e.g., generic name, GenBank number, etc.) to feature identifiers in the Index Set. These feature identifiers are various synonyms, genomic coordinates, etc., each of which points to one or more unique mapping identifiers. The mapping process may involve looking up feature identifier(s) that match an imported identifier, and then locating the mapping identifier(s) that the feature identifiers point to. In some cases, the best of a plurality of mapping identifiers is chosen for the mapping.

The mapping process may range from relatively simple (e.g., making a connection between a gene and its protein product) to the more complex (e.g., mapping a connection between a sequence element and a nearby gene on a given region of a chromosome). According to various embodiments, a feature may have a one-to-one mapping, i.e., each feature is mapped to single reference or mapping identifier. In other embodiments, where appropriate, features are mapped to a plurality of references or mapping identifiers. Three categories of mapping that may be employed are:

1) Feature-centric mapping
2) Sequence-centric mapping
3) Indirect Association

One or more of these types of mapping may be used, depending on the type of data imported.

i. Feature-Centric Mapping

Feature-centric mapping relies on established relationships between various features and their identifiers and is typically employed when there is a standard nomenclature for the feature and identifiers. For example, several different accession numbers can all map to a single gene. A protein product of a gene maps to that gene because that relationship is already established. Two different compound IDs that represent the same substance map to a common drug reference. Different accession numbers of gene A, names for gene A, protein product of gene A, etc. are all mapped to a unique reference for that gene.

In case of different organisms, orthologue information may be used to map all data between all available organisms. This is a "second" step in the feature-centric data mapping process. First, the features within the same organism are mapped to a central feature reference (within an Index Set for an organism of the Feature Set being imported). Next, orthologue information is used to create mapping for all data from species other than that of the imported data, e.g., such that a human gene feature is mapped to its orthologues in mouse, rat, drosophila, etc.

ii. Sequence-Centric Mapping

Sequence-centric mapping creates associations between various features based on their genomic coordinates. Sequence-centric mapping may be useful in situations where established relationships between various identifiers and/or features are unknown or do not exist. FIG. 6 shows schematic diagrams illustrating various feature relationships. First, in (a) genomic coordinates of feature 1 and feature 2 overlap. Each feature may be a gene, a genetic region, a protein product of a gene, etc. Sequence-centric mapping maps these features to each other based on the coordinate overlap. In (b), the coordinates of feature 1 include those of feature 2. For example, the features may be a haplotype block (feature 2) and a SNP (feature 1); or a genomic region (feature 2) and a gene (feature 1). Sequence-centric mapping maps these features to each other based on the coordinate inclusion. Sequence-centric mapping also may include mapping features in close proximity, but with no overlap, based on a pre-defined proximity value.

iii. Indirect Association Mapping

Indirect association establishes connections between features based on indirect relationships, e.g., using some prior research knowledge about relationships among different features or their physical proximity within the genome (in case of genes, SNPs or other sequence elements). Associative relationships do not have to be constant and can change depending on new emerging knowledge. Associative mapping does not require a feature to have a one-to-one mapping—having it point to a single reference feature or ID; features may be associated with several features simultaneously. For example, if a sequence region that is being imported falls within a given haplotype block, then associative mapping can be done between that sequence region and all genes within a given haplotype block. Another example is a region that is located within a known binding site of a gene. Although the feature of interest does not map directly to that gene, the region is potentially related to that gene through the binding site that regulates it, and so can be mapped to it. Another example of indirect mapping is shown in FIG. 6; in (c) SNP X is contained within the regulatory motif of gene A. Indirect associational mapping is used to map SNP X to gene A. Similarly features that overlap, are within, or are in close proximity to sequence regions that influence the activity of a gene may be mapped to the gene by associational mapping.

Returning to FIG. 5, features are ranked in an operation 506. Ranking involves ordering features within each Feature Set based on their relative levels of response to the stimulus or treatment in the experiment(s), or based on their magnitude and direction of change between different phenotypes, as well as their ability to differentiate different phenotypic states (e.g., late tumor stage versus early tumor stage). Ranking is typically based on one or more of the associated statistics in an imported Feature Set; for example, features may be ranked in order of decreasing fold-change or increasing p-value. In certain embodiments, a user specifies what statistic is to be used to rank features.

Figure 7:
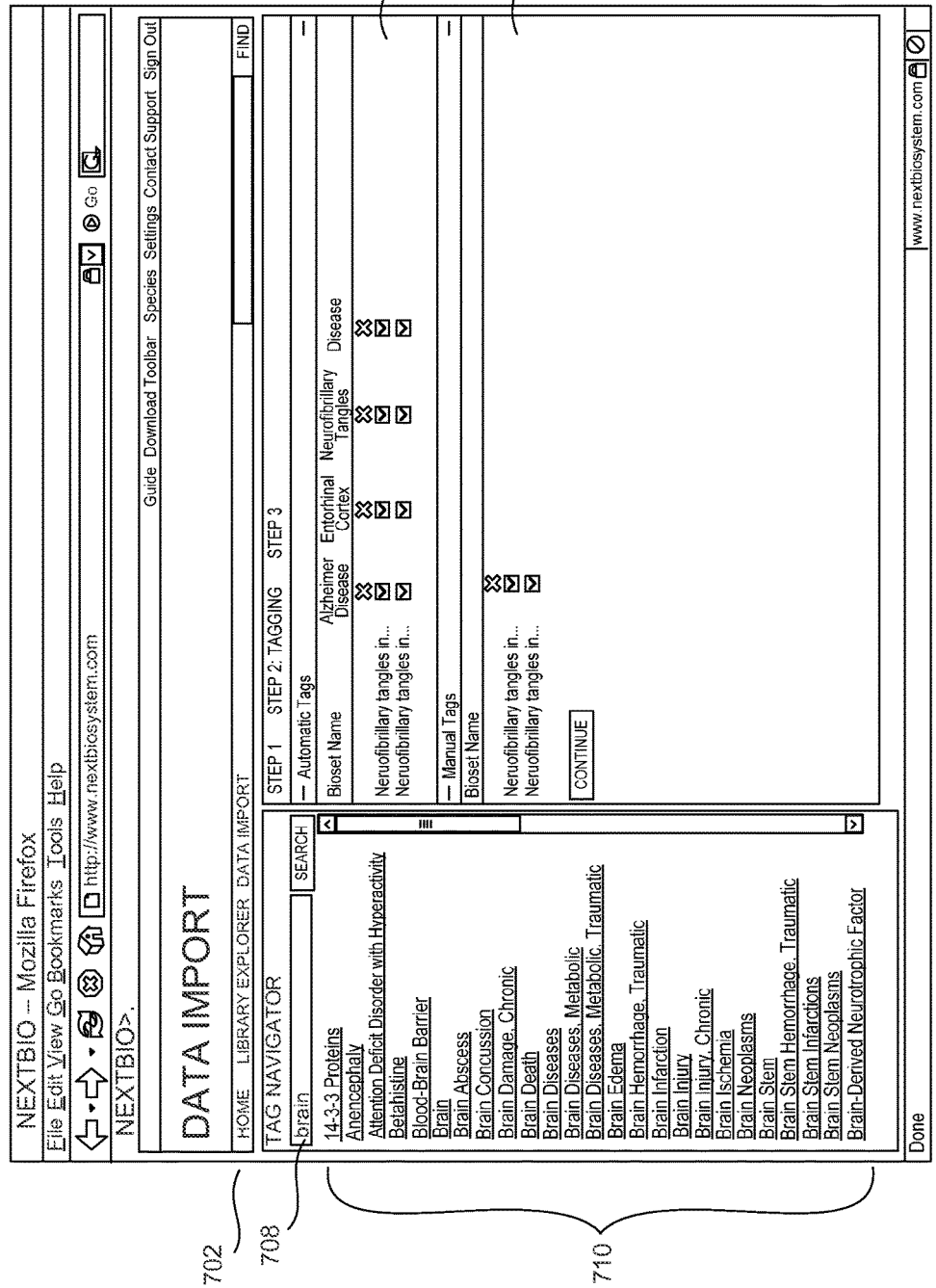
FIG. 7 is a screen (HTML page) display presenting a Tag Navigator and Tagging Screen for a graphical user interface of a system in accordance with one embodiment of the present invention.

Data tagging is performed in an operation 508 (operations 504-508 may be performed concurrently or in any order). Tags are standard terms that describe key concepts from biology, chemistry or medicine associated with a given study, Feature Set or Feature Group. Tagging allows users to transfer these associations and knowledge to the system along with the data. For example, if a study investigated beta blockers within a muscle tissue then the two tags may be "beta blockers" and "muscle." In addition, if a researcher knows that a given study is relevant to cardiovascular research, he/she can add a tag "cardiovascular disorders". Tagging may be performed automatically or manually. Automatic tagging automatically extracts key concepts for imported data. The system parses all text and documents associated with a given study and automatically captures and scores key concepts (e.g., based on frequency and specificity criteria) that match a database of tags—"standard" biomedical, chemical or other keywords. As indicated above, during the UI portion of the data import process, a user can specify additional files to be imported with the data, for example text descriptions of the experiments or studies. Automatic tagging parses these documents for terms that match tags in the database. In addition to automatic tagging, a user may "manually" or semi-automatically add tags to Feature Sets and Feature Groups. The user selects from tags in the database to associate with the Feature Sets and Feature Groups. In certain embodiments, the user may enter keywords to search the database. The search extracts the relevant tags and the user may add them to the imported data. FIG. 7 shows an example of a tagging user interface screen, with Tag Navigator area 702, Automatic Tags area 704 and Manual Tags area 706. The names of two imported Feature Sets related to neurofibrillary tangles (referred to as Bioset Names in the figure) are shown, along with tags automatically associated with the Feature Sets at 704. In this example, the Feature Sets are automatically tagged with Alzheimer Disease, Entorhinal Cortex, Neurofibrillary Tangles and Disease. Manually tagging involves entering a search term in a search box 708 in the Tag Navigator. In this example, "brain" is entered as a search term. Tags related to the search term are extracted and displayed in a results list 710. The user then selects tags from the results with which to manually tag the Feature Sets. In this example, the tag Brain has been selected, as shown at 706.

C. Preprocessing

Preprocessing, also referred to as correlation scoring, is performed after the data has been imported. All new data imported into the system is pre-processed—correlations are pre-computed across the entire information space. The mapping methods defined in previous section enable data to be connected across assay types, organisms and platforms. Once mapping is determined, correlation algorithms are applied automatically and systematically to pre-compute correlation scores (e.g., p-values and/or derivative rank scores) between a given set of data and any other biological, clinical, or chemical entity within the Knowledge Base.

The two major types of data/information that a newly imported data set is correlated to are Feature Sets and Feature Groups already in the system (e.g., previously imported by any user of the system). A Global Correlation Matrix (GCM) may be used to define all objects and Feature Sets that should be correlated to a new set of information. Pre-computations are then done according to GCM. Any new query outside of the pre-computed space can use GCM pre-computed scores as the foundation to formulate and compute a more complex query. For example, if a user is interested in identifying signaling pathways in common between two Feature Sets derived from two different treatment-based experiments, the system will retrieve all pre-computed pathway associations (from GCM) for each Feature Set and then determine the most highly correlated pathway between the Feature Sets (based on the pre-computed individual signature-pathway scores).

After data importation and prior to correlation scoring, the Feature Sets typically contain a name, an associated study name, a feature table containing feature identifiers, mapping identifiers, statistical information and tags. In many embodiments, preprocessing uses feature rankings to correlate Feature Sets. Thus, prior to computing a correlation score, the features in a Feature Set are ranked based on the p-value, fold change, or any other meaningful measurement or statistic contained in the feature table. The rank is based on the absolute value of the feature statistics in a given Feature Set. This ranking system ensures that features from Feature Sets with different statistics can still be compared based on their relative order or rankings across Feature Sets. Thus, for example, one Feature Set may have a feature ranked number two that has a 1.5 fold increase in response, while a different Feature Set has the same feature ranked number ten that has a 5 fold increase in response to a different stimulus. As indicated, above ranking is typically performed during data import.

In one embodiment, the statistical correlations are made by using a statistical test, e.g., Fisher's exact test. Fisher's exact test is based on exact probabilities from a specific distribution (the hypergeometric distribution), and is used to examine the significance of the association between two variables in a 2×2 contingency table. In certain embodiments, an algorithm designed to take into account the rankings of the overlapped features in Feature Sets and Feature Groups, employing Fisher's exact test, is used to efficiently generate correlation scores.

As indicated above, the correlations of interest in the methods of the invention are typically Feature Set to Feature Set correlations and Feature Set to Feature Group. In certain embodiments, Feature Group to Feature Group correlation scores may also be determined. Correlation scoring according to certain embodiments of the inventions is described below. First, the application of Fisher's exact test to measure the significance of association or overlap of Feature Sets with other Feature Sets/Groups is discussed, and then its use in a 'running' algorithm to generate correlation scores to be stored in a Scoring Table according to embodiments of the invention. As indicated, the running algorithm takes into account the feature rankings.

i. Feature Set to Feature Group Correlation Scoring

Correlation scoring may be performed by any appropriate method. In certain embodiments of the invention, rank-based enrichment algorithms, which take into account feature rankings, are used. Also as indicated above, Fisher's exact test may be used to measure the significance of association of two variables. (See, Fisher, R. A. (1922). "On the interpretation of $\chi^2$ from contingency tables, and the calculation of P". *Journal of the Royal Statistical Society* 85(1):87-94, which is hereby incorporated by reference for all purposes). In embodiments of the invention, Fisher's exact test is used to measure the significance of the overlap of features in a given Feature Set B with features in a given Feature Group C.

Figure 8:
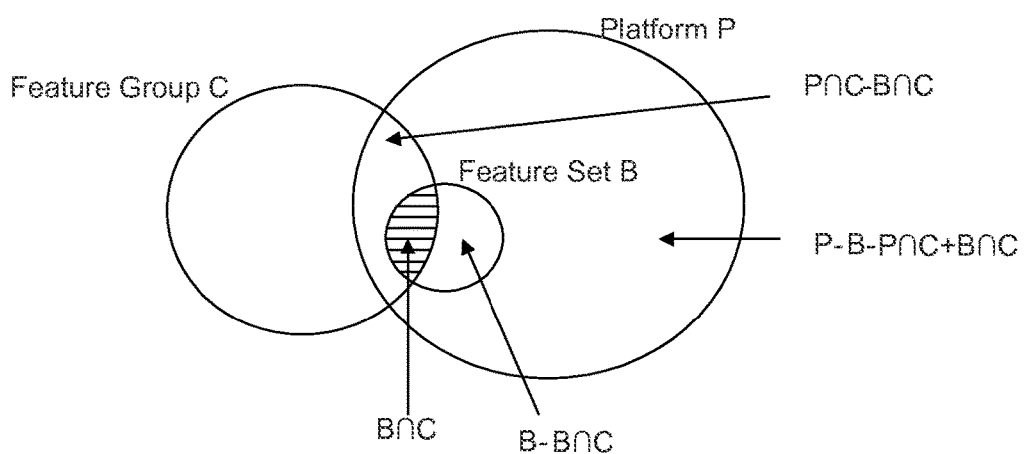
FIG. 8 is a set diagram showing an example of a Feature Set versus Feature Group relationship.

FIG. 8 is a Feature Set versus Feature Group set diagram. P represents all features in the experimental platform (e.g., all genes that a microarray test measures expression of or all features in the raw data); B represents the features in the Feature Set; and C represents the features in the Feature Group. The table below the set diagram shows the sets indicated on the diagram. In applying Fisher's exact test in any situation, it is necessary to define four parameters or elements of the contingency table that will give meaningful results. The elements of the contingency table used in Fisher's exact test in accordance with embodiments of the invention are highlighted in the table in FIG. 8. These elements are:

B∩C is the intersect of Feature Set B and Feature Group C, and is shown as the striped subset in the diagram. This represents features in B that are mapped to features in C;

P∩C-B∩C represents the features in P that are mapped to C, but are not in B, and is indicated on the diagram;

B-B∩C represents the features in B that are not mapped to features in C and is indicated on the diagram;

P-B-P∩C+P∩C represents the features in P that are neither in B nor mapped to features in C. This subset is also indicated on the diagram.

Applying Fisher's exact test, a p-value is obtained. The implementation of Fisher's exact test is based on Agresti A, (1992), A Survey of Exact Inference for Contingency Tables, *Statistical Science*, 7, 131-153, hereby incorporated by reference.

Figure 9A:
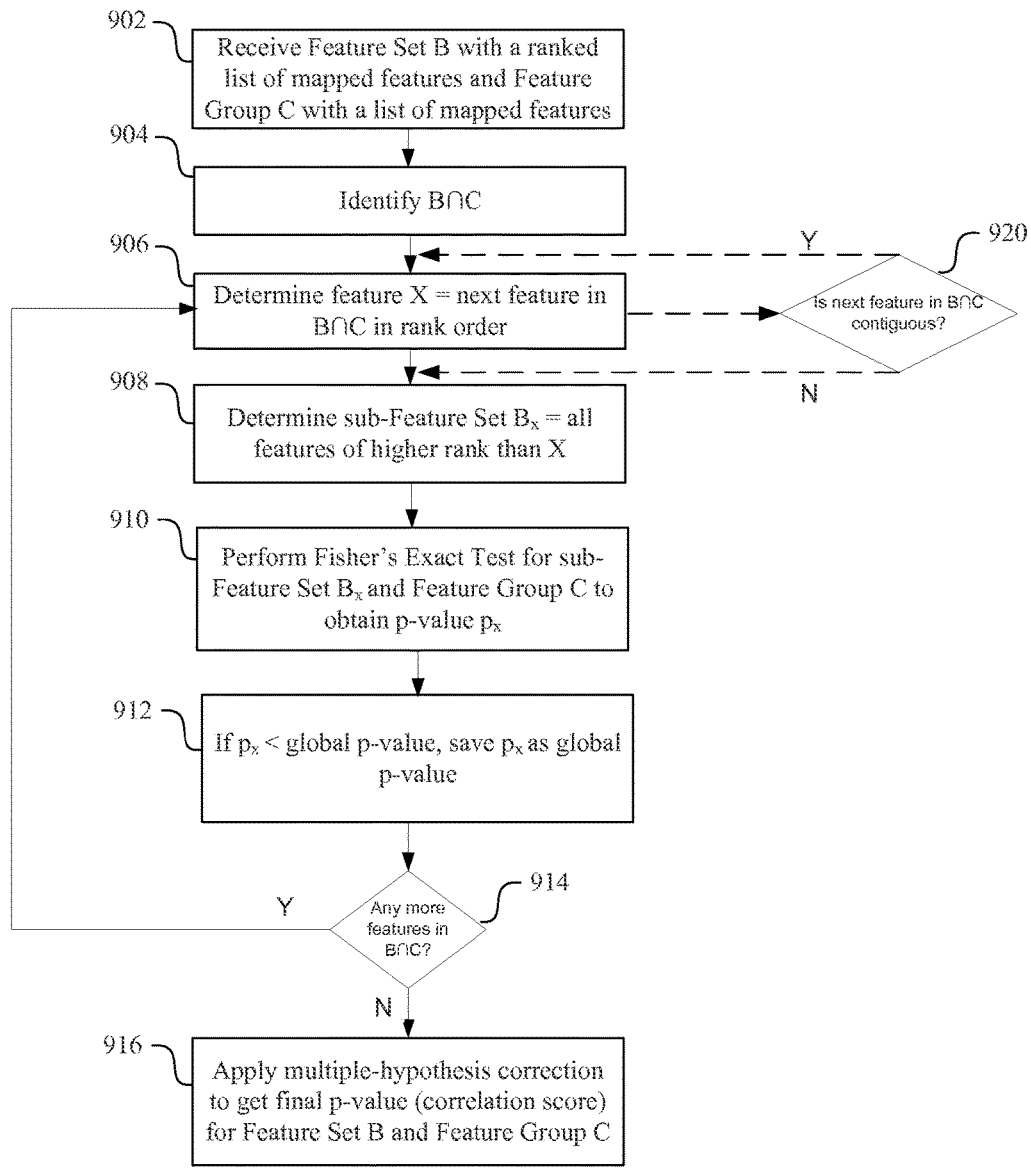
FIG. 9A is a flow diagram presenting key steps in correlating a Feature Set to a Feature Group.

FIG. 9A is a process flow diagram showing key operations in generating a correlation score indicating the correlation between a Feature Set B and Feature Group C. This 'running' algorithm can be described as iterations of the Fisher's exact test at dynamic checkpoints. The process begins with receiving Feature Set B and Feature Group C (902). The features in the Feature Set have been ordered by rank, as discussed above. An example of a Feature Set feature table with rankings is shown in FIG. 9B. The rank is shown in column 952. The file also contains mapping identifiers in column 956. In the example shown in FIG. 9B the feature table also contains an imported ID column (954) displaying the feature identifiers as received during data import; a symbol column (958) displaying symbols associated with the features; a p-value column (960) displaying p-values as measured in the experiment; and a fold-change column (962) displaying fold changes as measured in the experiment. The rankings shown in column 952 are based on fold-change; however they may also be based on p-value, other appropriate statistics or a combination thereof. The Feature Group C also contains a list of feature identifiers and mapping identifiers, however, it typically does not contain rankings or other statistics. Common mapping identifiers allow determination of the members of the B∩C subset in an operation 904 shown in FIG. 9A. The highlighted rows in FIG. 9B indicate the features that are members of the B∩C subset. After receiving the Feature Set B and Feature Group C, feature X is determined (906). Feature X is the next feature in B∩C in rank order. Thus, for the first iteration of the process as applied to the Feature Set shown in FIG. 9B, Feature X is the feature ranked 11, which is indicated at Stop 1 in column 964. This is the first checkpoint. Returning to FIG. 9A, a sub-Feature Set $B_X$ is determined (908). (Decision diamond 920 indicates an optimization step that is discussed further below). Sub-Feature Set $B_X$ is the set of all features having a rank equal to or higher than X. So, for the first iteration, Sub-Feature Set $B_X$ contains the features ranked 1-11. Fisher's exact test is then performed for Sub-Feature Set $B_X$ and Feature Group C in an operation 910, using the parameters described above (i.e., $B_X \cap c$, $P \cap C$-$B_X \cap C$, etc.). The resulting p-value, $p_X$ is then compared to a global p-value, and if it is less than the global p-value, it is saved as the (new) global p-value. For the first iteration, where there is no pre-existing global p-value, $p_X$ is saved as the global p-value with which to be compared in the successive iteration. Note that for the first iteration, $B_X \cap C$ has one member, with every successive iteration adding a member. Decision 914 then determines if there are any remaining features in $B \cap C$. If there are, the process returns to operation 906, in which feature X is identified. For example, for the second process iteration of the Feature Set shown in FIG. 9B, feature X is the feature ranked 13, and sub-Feature Set $B_X$ contains features ranked 1-13.

Essentially, the process looks at all possible p-values for all Sub-Feature Sets $B_X$ and selects the lowest p-value. It should be noted that performing Fisher's exact test only at the "stop" points indicated returns the same result as if it were performed at each ranked feature. This is because the p-values from Fisher's exact test performed at all non-stop points will be higher than the global p-value (with P and C remaining constant, the p-value for B=y and $B \cap C$=z is less than that for B=y+1 and $B \cap C$=z).

Once there are no remaining features in $B \cap C$, a multiple-hypothesis testing correction is applied to the global p-value to obtain a final p-value for Feature Set B and Feature Group C (916). The p-value is multiplied by the size of the Feature Set. This correction accounts for the fact that larger Feature Sets return lower p-values, as there are more opportunities for lower p-values to be received with larger Feature Sets. Multiple-hypothesis testing corrections are known in the art. This final p-value is then stored, e.g., in a Scoring Table. In certain embodiments, a 'rank score' is stored in the Scoring Table in addition to or instead of the final p-value. Briefly, the rank score is a derivative of the final p-value and is the negative logarithm of the p-value.

a. Optimization

To improve computational efficiency, various optimizations may be implemented. One optimization is described above, in which Fisher's exact test is performed only for Sub-Feature Sets at "stop" points, as p-values calculated using other Sub-Feature Sets will not return lower p-values. Another optimization may be performed by checking to see if the next feature in $B \cap C$ is contiguous. This is shown in decision 920 of FIG. 9A. Contiguous features are those next to each other in ranked order. If the next overlapping feature is contiguous, the calculation at feature X may be skipped, and the process returns to operation 904, wherein the feature X is determined, which in this case is just the next feature. For example, referring to FIG. 9B, when the process is at checkpoint 'stop 3' at the feature ranked 17, the next feature in $B \cap C$ (the feature ranked 18) is contiguous. The calculation at 'stop 3' is skipped, and Fisher's exact test is then performed at 'stop 4.' This is because under these conditions (the next stop is contiguous), the returned p-value will be lower for the higher ranked feature.

ii. Feature Set to Feature Set Correlation Scoring

The algorithm discussed above with respect to FIGS. 9A and 9B takes into account the Feature Set rankings of the overlapped features in calculating a p-value indicating the correlation between Feature Set A and Feature Group B. Similarly, a 'running' algorithm employing Fisher's exact test iteratively is used to calculate a p-value indicating the correlation between two Feature Sets F1 and F2. The Feature Set versus Feature Set case is significantly more complex, however, as it takes into account two sets of rankings—those in Feature Set F1 and those in Feature Set F2.

Figure 10:
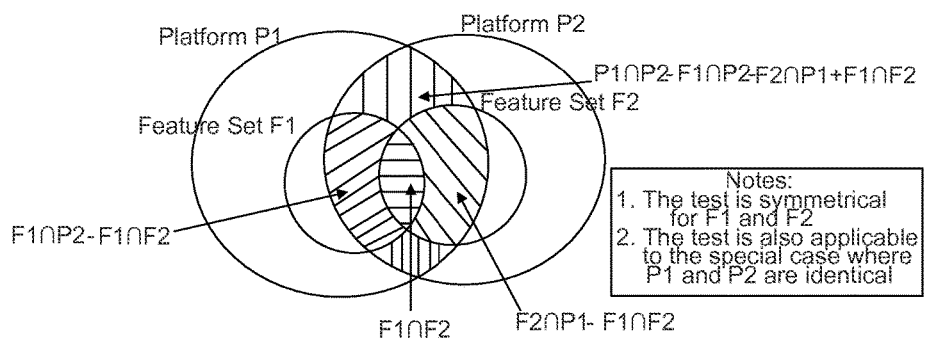
FIG. 10 is a set diagram showing an example of a Feature Set versus Feature Set relationship.

FIG. 10 is a Feature Set (F1) versus Feature Set (F2) set diagram, and table showing the elements or parameters to be used in Fisher's exact test measuring the significance of the overlap of the Feature Sets. These are:

F1∩F2 is the intersect of Feature Set F1 and Feature Set F2, and is indicated in the diagram. This represents features in F1 that are mapped to features in F2;

F1∩P2−F1∩F2 represents the features in the intersect of P1 and P2 that are in F1, but are not in F2;

F2∩P1−F1∩F2 represents the features in the intersect of P1 and P2 that are in F2, but are not in F1;

P1∩P2−F1∩P2−F2∩P1+F1∩F2 represents the features in the intersect of P1 and P2 that are neither in F1 or F2.

Figure 11A:
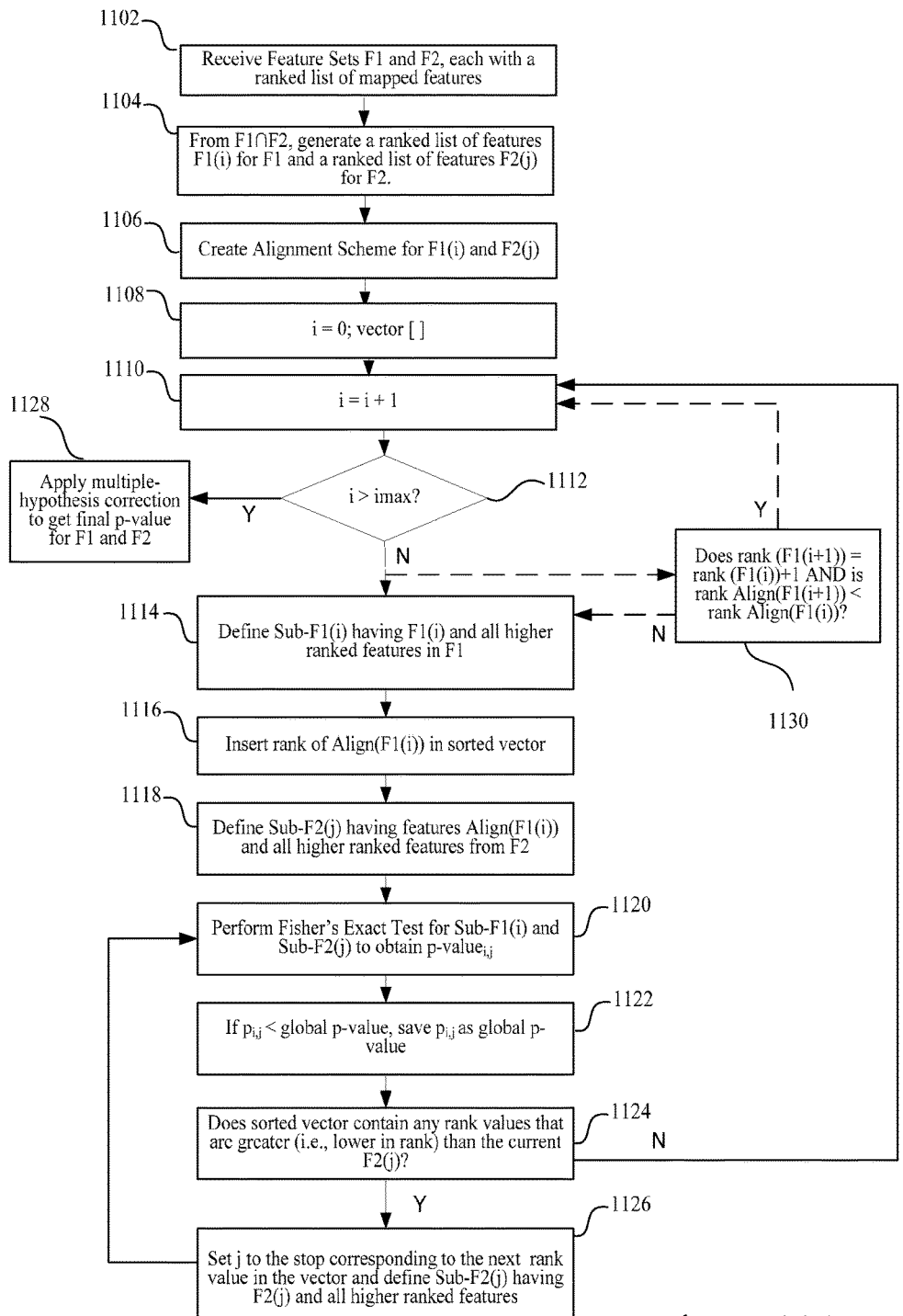
FIG. 11A is a flow diagram presenting key steps in correlating a Feature Set to another Feature Set.

FIG. 11A is a process flow diagram showing key operations in generating a correlation score indicating the correlation between Feature Sets F1 and F2. First, in an operation 1102, Feature Sets F1 and F2 are received, each with a ranked list of mapped features, e.g., as shown for one Feature Set in FIG. 9B. The intersect F1∩F2 is determined using the mapping identifiers. From F1∩F2, a ranked list of features F1(i) and F2(j) are generated.

The variables "i" and "j" are used to designate stops or checkpoints of F1 and F2, respectively. As in the Feature Set to Feature Group running algorithm described above, stops are used to define sub-Feature Sets for which to generate p-values, the lowest of which is the final p-value for the Feature Set to Feature Set comparison. In a brute force method, Fisher's exact test would be performed for all combinations of sub-F1(i) Sets and all possible sub-F2(j) sets. However, this is not necessary, as reflected in the algorithm below. All i=1 to i=imax stops in F1(i) are indexed over in an outer loop. The inner loop, however, does not index over all possible values of j, but determines what Sub-F2 Sets to use based on a sorted vector. In this sense, "j" indicates the current stop of F2 being used to define the Sub-F2 Set, from which a p-value $p_{i,j}$ is calculated.

Note that though the features in F1(i) and F2(j) are the same (i.e., all overlapping features from F1 and F2), the ranked lists are different as the F1 and F2 have different rankings FIG. 11B shows an example of ranked lists of F1 and F2 (for ease of description, only the rankings are shown; however as in FIG. 9B, the tables may also include feature identifiers, mapping addresses, statistics, etc.). The highlighted ranks in each Feature Set indicate the members of F1∩F2. Thus, F1(1)=the F1 feature ranked 1st; F1(2)=the F1 feature ranked 5th; F2(1)=the F2 feature ranked 2nd, F2(2)=the F2 feature ranked 7th, etc.

F1(i) and F2(j) are then 'aligned,' i.e., each feature F1(i) is connected to or associated with its corresponding feature F2(j) (1106). This is graphically depicted in FIG. 11C, in which the F1(1) is aligned with F2(3); F1(2) is aligned with F2(2); F1(3) is aligned with F2(4), etc. The nomenclature Align(F1(i)) is used in the flow sheet and in the following description to refer to the feature in F2(j) that F1(i) is aligned to; for example, Align(F1(3)) refers to F2(4). Similarly Align(F2(3)) refers to F1(1). A counter i is set to zero (1108). Operation 1108 also indicates that a sorted vector used later in the algorithm to determine Sub-F2 Sets is empty at this point. Counter i is indexed (i=i+1) at an operation 1110. Counter i is compared to imax, where imax is the number of features in F1(i) (1112). If it is less than or equal to imax, the process proceeds to an operation 1114, in which a Sub-Feature Set Sub-F1(i) is defined. (Operation 1130 is an optimization step that is discussed further below). Sub-F1(i) contains F1(i) and all higher ranked features in F1. So, for example in the example presented in FIG. 11C, Sub-F1(1) contains only F1(1) as it is the highest ranked feature. The rank of F1(2) is 5, so Sub-F1(2) would contain the features in F1 that are ranked 1-5. The rank of Align(F1(i)) is then inserted into the vector (1116). For F1(1), the vector would be [13]; for F1(2), the vector would be [2,13], etc. The process then defines a Sub-Feature Set Sub-F2(j) in an operation 1118. Sub-F2(j) contains Align(F1(i)) and all higher ranked features in F2. For i=1, Align(F1(1))=F2(3). The rank of F2(3) is 13, so Sub-F2(j) contains the features in F2 ranked 1-13. Fisher's exact test is then performed for Sub-F1(i) and Sub-F2(j) using the parameters described above with respect to FIG. 10 to generate a p-value $p_{i,j}$ (1120). The p-value $p_{i,j}$ is then compared to the global p-value and saved as the global p-value if it is lower (1122). Determining if the current sub-F1(i) should be compared to other sub-F2 sets involves checking if the sorted vector contains any rank values that are higher (i.e., lower in rank) than the rank of the current F2(j) (1124). If it does, j is set to the stop corresponding to the next rank value in the vector and a new Sub-F2(j) containing F2(j) and all higher-ranked features in F2 is defined (1126). For example, for the first iteration of the inner loop for i=2 in the example shown in FIG. 11C, j=1 (Align(F1(2))=F2(1)). The rank of F2(1) is 2, so the vector contains [2,13]. First a p-value $p_{2,1}$ is calculated. Then the vector is checked to see if contains any ranked values that are greater (lower in rank) than the rank of 2. It does as 13 is greater than 2 (also stated as 13 is lower in rank than 2). A new Sub-F2(j) is created using the F2 stop corresponding to rank 13 as the new j; in this case Sub-F2(3) is created, containing the F2 features ranked 1-13. The process then returns to operation 1120, in which Fisher's exact test is performed for F1(i) and the new F2(j). Returning to operation 1124, if there are no rank values greater than the rank of current F2(j), the process returns to operation 1110 to calculate p-values for the next F1 stop. Once all F1 stops have been run through and i>imax, a multiple hypothesis testing correction is applied (1128). This correction is based on the total number of possible hypothesis tests, i.e., all possible combinations of F1 and F2 Sub-Feature Sets.

Figure 11C:
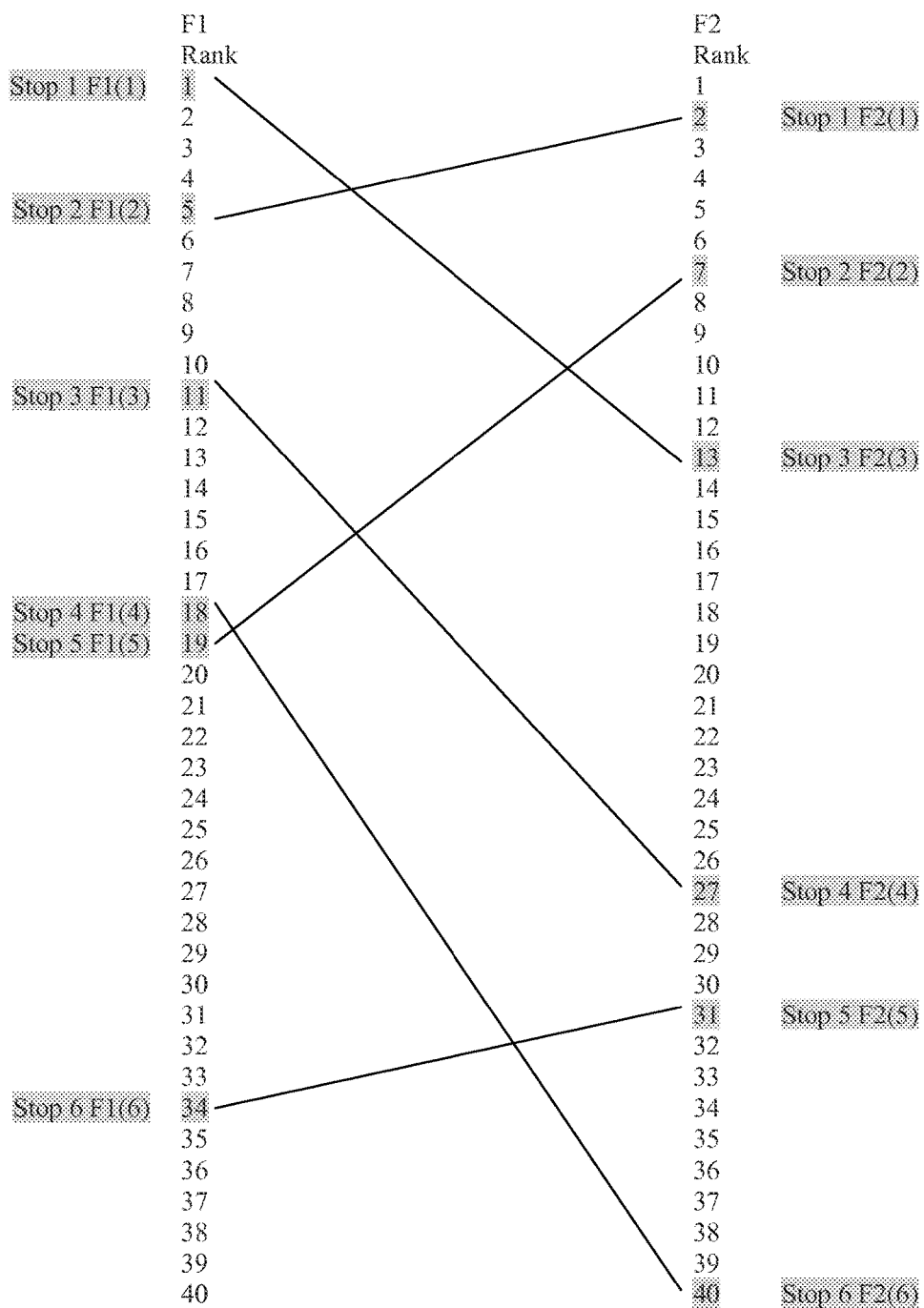
FIG. 11C is a representation of features lists of two Feature Sets (F1 and F2) that are to be correlated to one another. Lines indicate features that are mapped to or aligned with one another.

A few sample iterations based on the F1 and F2 shown in FIG. 11C are shown below:
Iterate through F1 stops at ranks 1, 5, 11, 18, 19, 34
imax=6
i=1 Stop 1
Rank F1(1)=1
Align(F1(1))=F2(3); j=3
Rank F2(3)=13
Sorted vector [13]
   $p_{1,3}$=0.0274 (set as global)
   Any values in vector greater than 13? No
i=2 Stop 2
Rank F1(2)=5
Align(F1(2))=F2(1); j=1
Rank F2(1)=2
Sorted vector [2,13]
   $p_{2,1}$=0.00269 (set as global)
   Any values in vector greater than 2? Yes
   j=3 (corresponds to rank 13)
   $p_{2,3}$=0.00157 (set as global)
i=3 Stop 3
Rank F1(3)=11
Align(F1(3))=F2(4); j=4
Rank F2(4)=27
Sorted vector [2,13,27]
   $p_{3,4}$=0.00129 (set as global)
   Any values in vector greater than 27? No
The process continues for F1 stops 4-6.

a. Optimization

To improve computational efficiency, various optimizations may be implemented. One optimization is shown in FIG. 11A at operation 1130, in which stop i may be skipped if the next stop is contiguous and links to a higher rank. In the flow chart of the figure, prior to defining the Sub-F1(i) set, the rank F1(i+1) is compared to the rank (F1(i))+1. If these are equal, the F1(i) and F1(i+1) are contiguous. If they are contiguous and rank Align(F1(i+1))<rank Align(F1(i)), then the stop may be skipped.

For example, returning to FIG. 11C, for i=4:
Rank F1(i+1)=Rank(4+1)=Rank(5)=19
Rank F1(4)+1=18+1=19
Align(F1(i+1))=Align(F1(5))=F2(2)
Rank F2(2)=7
Align(F1(0)=Align(F1(4))=F2(6)
Rank F2(6)=40

Because the F1(4) and F1(5) stops are ranked $18^{th}$ and $19^{th}$ and so are contiguous and because F1(5) links to a higher F2 rank (7) than F1(4), stop 4 may be skipped, as stop 5 will result in a better p-value.

A second optimization may be performed on the inner loop, wherein the calculation at a "j" may be skipped if the next j-value is contiguous, i.e., if j+1 is an element of the vector. This is essentially the same optimization as described above for the Feature Set to Feature Group correlation.

D. Knowledge Base Elements

Figure 12:
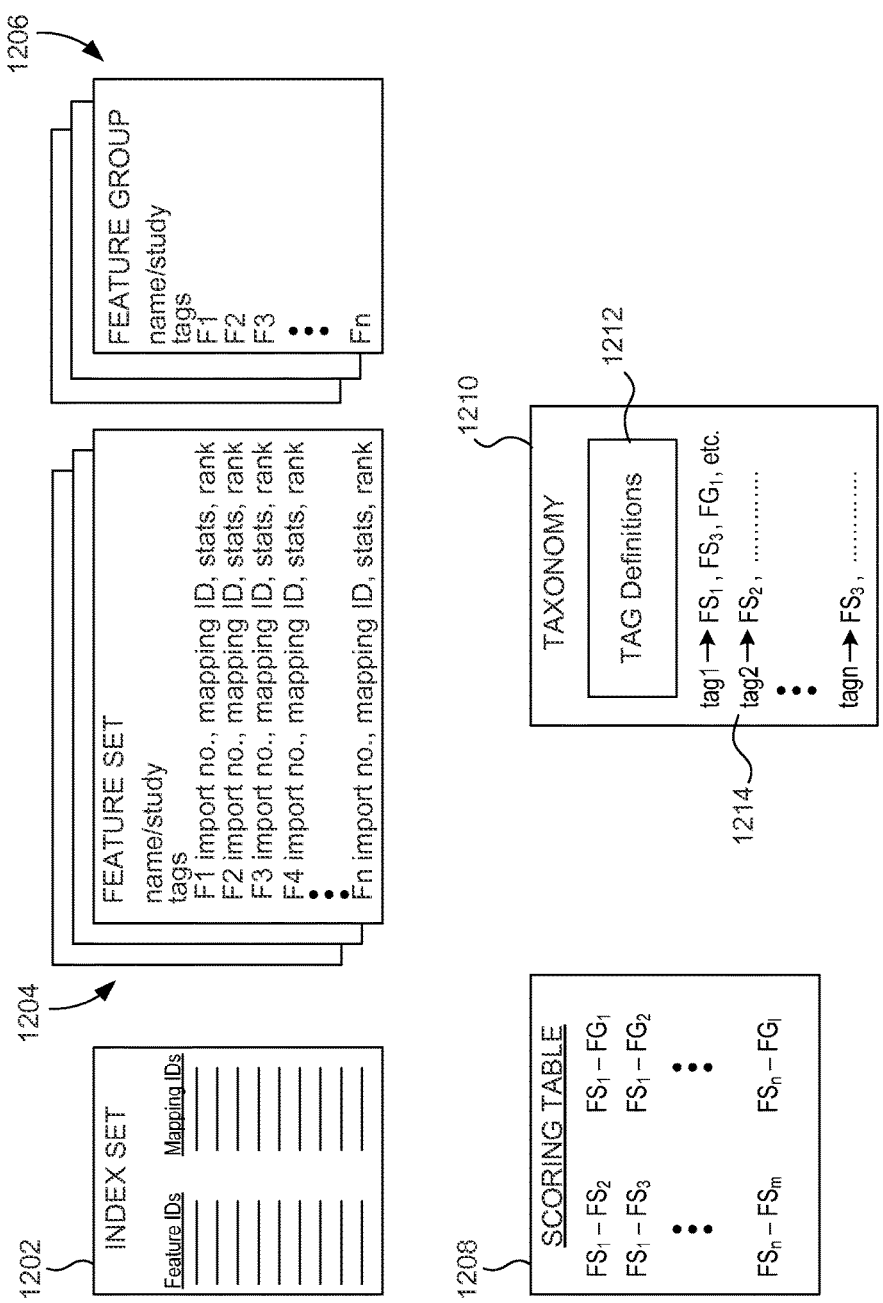
FIG. 12 is a schematic representation of the various elements or entities that are in a Knowledge Base in accordance with various embodiments of the present invention.

FIG. 12 shows a representation of various elements in the Knowledge Base according to various embodiments of the invention. Generation of or addition to some of these elements (e.g., Feature Sets and Scoring Table) is discussed above with reference to FIGS. 1-11C. In some cases, the above discussion assumes that various elements of the Knowledge Base described below (e.g., Index Set, Tag Definitions) are already present in the system.

Element 1202 is an Index Set, which is used to map features during the data import process. The Index Set typically contains feature identifiers (also referred to as pointers) and mapping identifiers. The feature identifiers contain the set of all synonyms, sequence coordinates, etc. that may be used to identify a feature. Thus, multiple feature identifiers may all point to a single mapping identifier. Mapping identifiers each represent a unique feature. For example, an Index Set may contain millions of feature identifiers and hundreds of thousands of mapping identifiers. Feature identifiers and mapping identifiers of the Index Set may be added to or updated when new information or knowledge is acquired. Feature and mapping identifiers may also be updated during the mapping process of data import; for example, if mapping cannot be established to an imported feature, that feature acts as its own mapping identifier.

Element 1204 indicates all the Feature Sets in the Knowledge Base. As has been described above, after importation, the Feature Sets typically contain at least a Feature Set name and a feature table. The feature table contains a list of features, each of which is usually identified by an imported ID and/or a feature identifier. Each feature has one or more mapping identifiers as well as a rank. Mapping identifiers and ranks are determined during the import process as described above, and then used in preprocessing to generate correlation scores. The feature table also typically contains statistics associated with each feature, e.g., p-values and/or fold-changes. One or more of these statistics is used to calculate the rank of each feature. The Feature Sets may also contain an associated study name and/or a list of tags. As discussed above, Feature Sets may be generated from data taken from public or internal sources.

Element 1206 indicates all the Feature Groups in the Knowledge Base. Feature Groups contain a Feature Group name, and a list of features (e.g., genes) related to one another. A Feature Group typically represents a well-defined set of features generally from public resources—e.g., a canonical signaling pathway, a protein family, etc. The Feature Groups do not typically have associated statistics or ranks. The Feature Sets may also contain an associated study name and/or a list of tags.

Element 1208 indicates a Scoring Table, which contains a measure of correlation between each Feature Set and all other Feature Sets and each Feature Set and all Feature Groups. In the figure, $FS_1$-$FS_2$ is a measure of correlation between Feature Set 1 and Feature Set 2, $FS_1$-$FG_1$ a measure of correlation between Feature Set 1 and Feature Group 1, etc. In certain embodiments, the measures are p-values or rank scores derived from p-values.

Element 1210 is a taxonomy that contains a list of all tags (keywords) for different tissues, disease states, compound types, phenotypes, cells, as well as their relationships. These may be organized in a hierarchical structure (e.g., Diseases/Classes of Diseases/Specific Diseases in each Class). This list is indicated in the taxonomy as Tag Definitions 1212. The taxonomy may also contain a list of all Feature Sets and Feature Groups associated with each tag. This is indicated in area 1214 (tag1 is associated with FS3, FS4, FG1, etc.).

FIG. 12 presents an example of the organization and storage of these elements and their members and one of skill in the art will realize that there are many ways in which they may be organized and stored.

3. Queries

The above description of methods, computational systems, and user interfaces for creating and defining a Knowledge Base provides a frame work for describing a querying methodology that may be employed with the present invention. The querying methodology described herein is not however limited to the specific architecture or content of the Knowledge Base presented above.

Generally, a query involves (i) designating specific content that is to be compared and/or analyzed against (ii) other content in a "field of search" to generate (iii) a query result in which content from the field of search is selected and/or ranked based upon the comparison. As examples, the following discussion will focus on three general types of queries: Feature Set queries, Feature Group queries, and feature-specific queries. These general types of queries are presented in FIGS. 13-17.

Figure 13A:
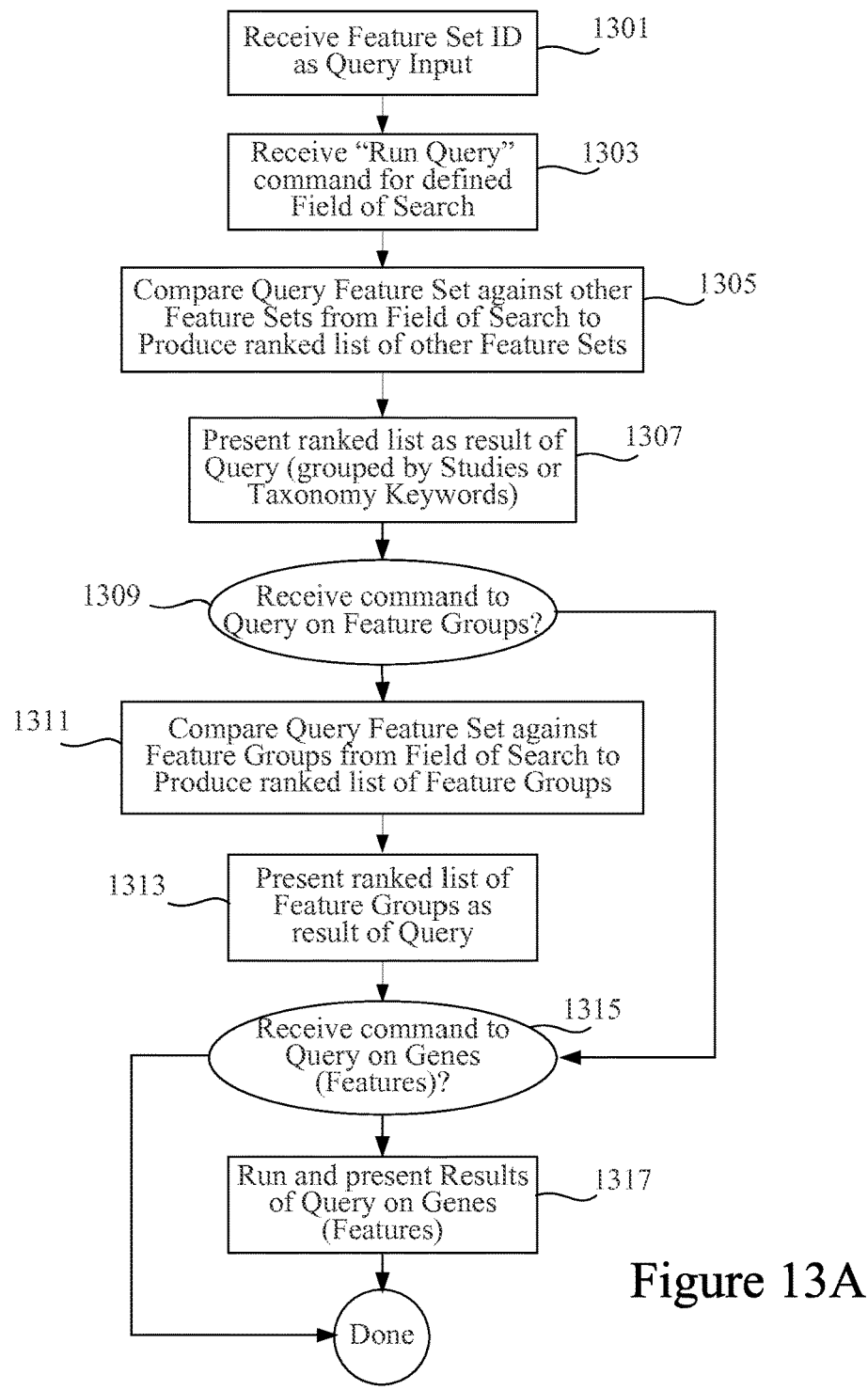
FIG. 13A is a process flow diagram depicting some operations in processing a query employing a single Feature Set as the query input in accordance with certain embodiments.
Figure 13B:
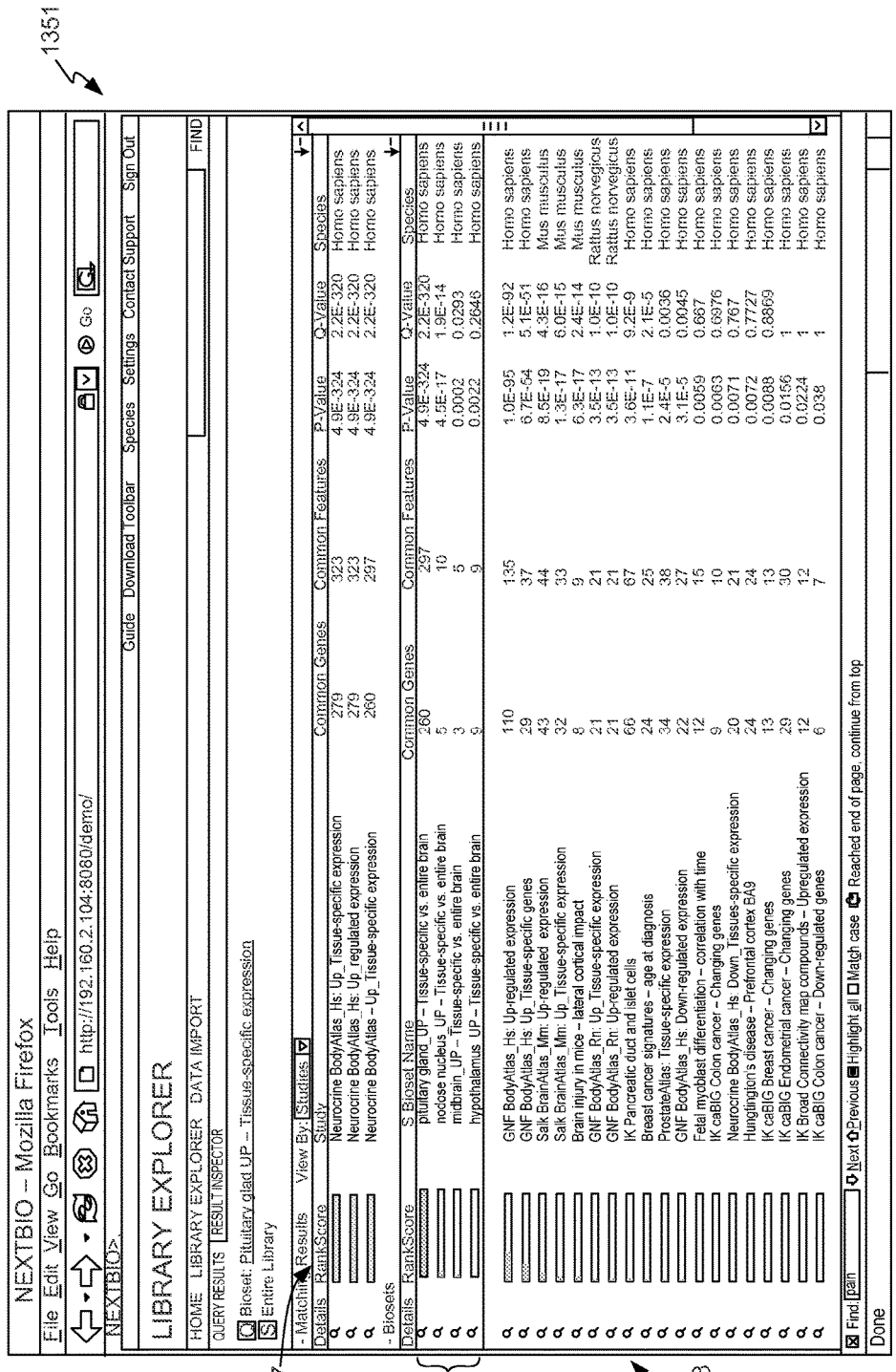
FIG. 13B is a screen shot depicting a query results window for a Feature Set versus Feature Sets query.
Figure 13C:
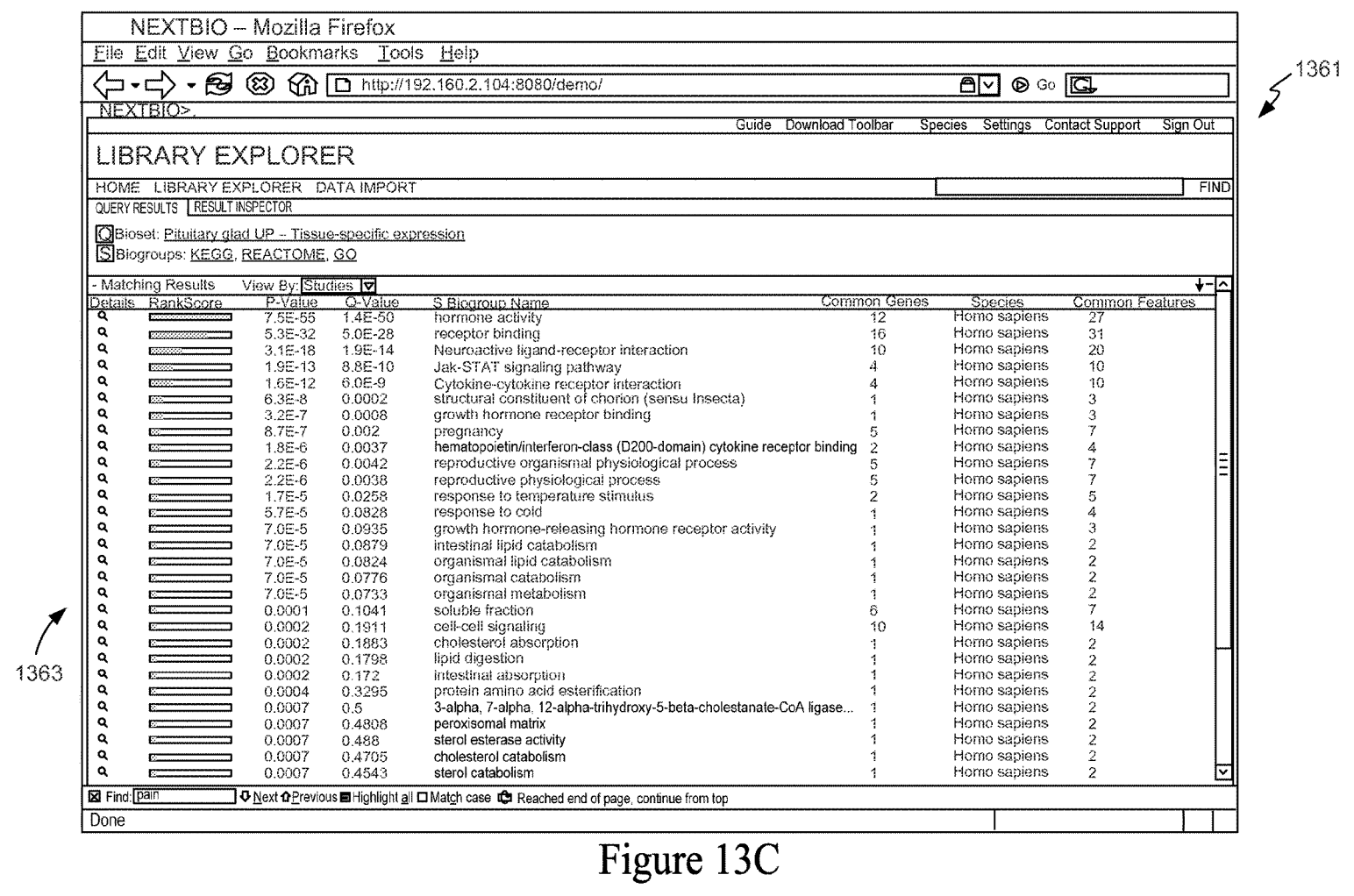
Figure 14:
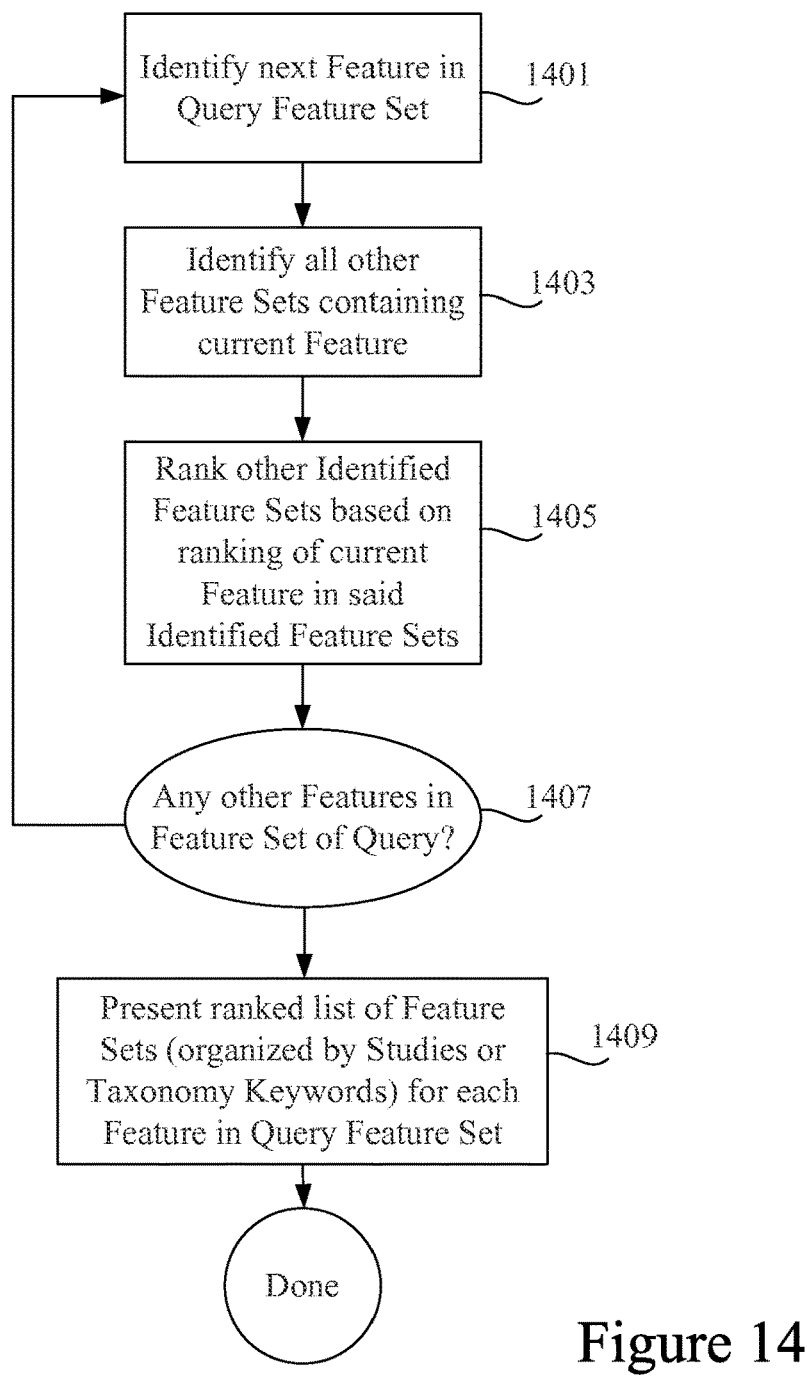
FIG. 14 is a process flow diagram depicting processing a query employing multiple Features from a Feature Set as the query inputs.
Figure 18:
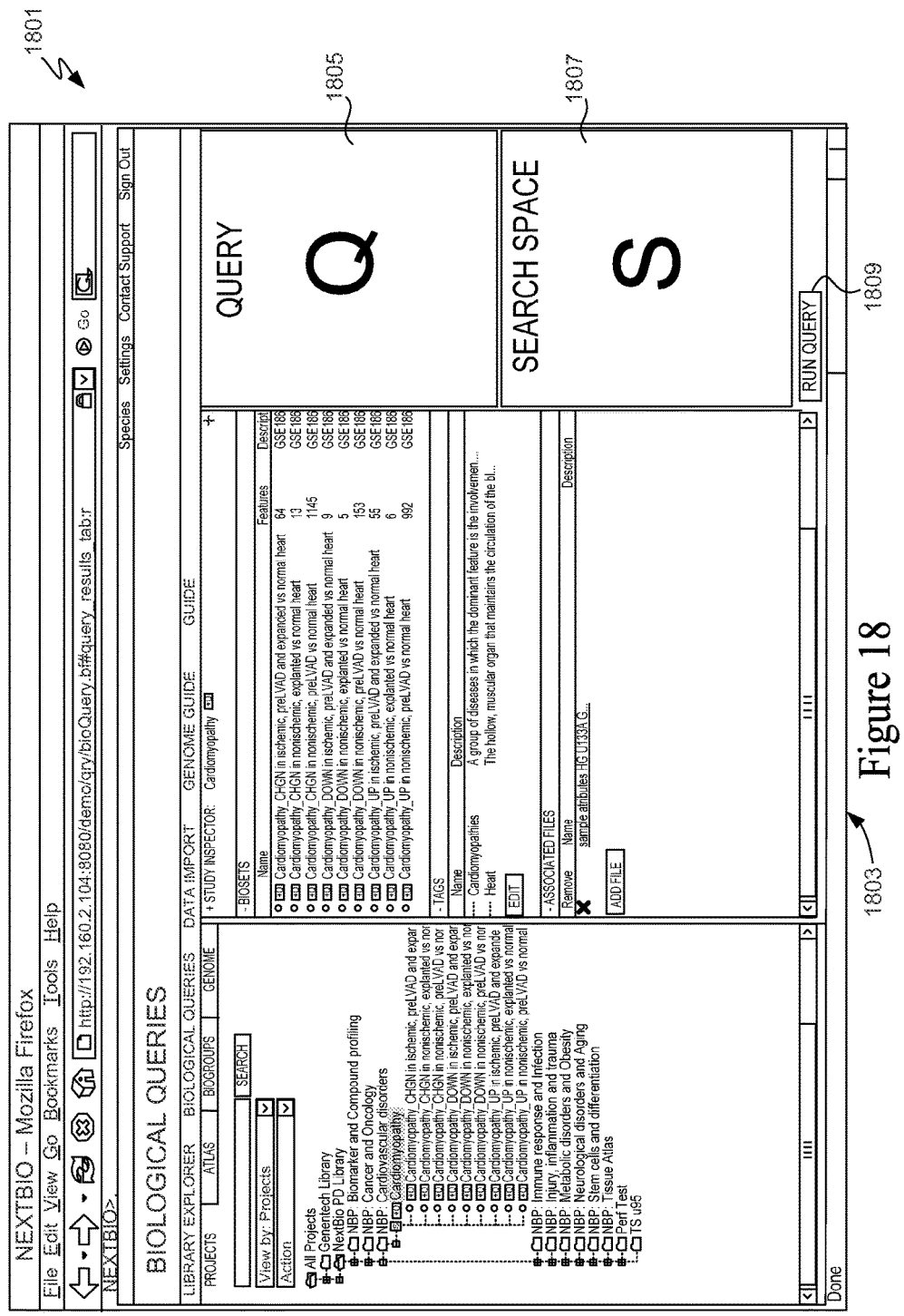
FIG. 18 is a screen shot depicting a query input window for flexibly inputting queries of various types in accordance with certain embodiments.

First, FIGS. 13-15 present flow charts depicting operations that may be employed in a Feature Set specific query in accordance with embodiments of this invention. FIG. 13A depicts a sequence of operations that may be employed when a user identifies a single Feature Set for the query (as distinguished from the case where the user presents multiple Feature Sets for a query). In single Feature Set queries, the user identifies one Feature Set as an input for running the query. He or she may do this by browsing through a list of Feature Sets organized by Study and Project or some other ontology such as a hierarchy of taxonomy keywords (Tags). Alternatively, the user may manually enter the identity of a Feature Set he or she is familiar with. Regardless of how the query Feature Set is entered, the system receives the identity of that Feature Set as a query input as depicted at block 1301 in FIG. 13A. In certain embodiments such as those employing user interfaces as depicted in FIG. 18, the system will not actually execute a query on the identified Feature Set until an appropriate command is received. In the context of the flow chart in FIG. 13A, this command is a "Run Query" command as identified at block 1303.

Note that the query may be limited to a particular field of search within the Features, Feature Sets and Feature Groups of the Knowledge Base. Of course, the search may include the entire Knowledge Base and this may be the default case. The user may define a field of search or the system may define it automatically for particular types of Feature Sets. In one embodiment, as depicted in the user interface of FIG. 18, the field of search is defined within a region labeled "S" in a query input window, while the Feature Set or other query input is provide in a region labeled "Q" in the query input window.

To actually generate results for the query, the system compares the query Feature Set against all other Feature Sets for the field of search. It may do this employing, for example, the pre-computed scoring table of a Knowledge Base as shown in FIG. 12. As indicated above, such scoring tables may be generated from correlations of each Feature Set against all other Feature Sets in the Knowledge Base and each Feature Set against all Feature Groups in the Knowledge Base. The correlation scores (p-values or otherwise) provide a convenient way to rank all other Feature Sets in the field of search against the Feature Set used in the query. Thus, as indicated at block 1305 in FIG. 13A, a comparison of the query Feature Set against all other Feature Sets in the field of search is used to produce a ranked list of the other Feature Sets. This ranked list can be used to display the other Feature Sets from the field of search in descending order, with the most highly correlated (or otherwise most relevant) other Feature Set listed first, at the top of the list. As indicated in block 1307 of FIG. 13A, the resulting ranked list may be presented as a result of the query via a user interface.

In certain embodiments, the other Feature Sets identified at operation 1305 are simply presented as a list of individual Feature Sets at operation 1307. In other embodiments, for convenience, the other Feature Sets may not be directly shown in the query results screen. Rather, for example, the Studies containing the query result Feature Sets are listed. See the user interface of FIG. 13B. In other embodiments, taxonomy groups are listed as surrogates for the Feature Sets in the ranked list. Such taxonomy groups may be based on Tags such as "cancer" or "stage 2 lymphoma," etc.

FIG. 13B shows a sample results screen 1351 for a Feature Set versus Feature Sets query such as depicted in block 1307 of FIG. 13A. In this example, the user took a pituitary-specific genes bioset and queried it against all other Feature Sets in a Knowledge Base. As shown, Studies containing the ranked Feature Sets (biosets) resulting from the query are presented as rows 1353. One of the Studies has been expanded to show individual Feature Sets (biosets) as rows 1355. Note that all Feature Sets (whether presented as such or as Studies containing them) are depicted with a "rank score" 1357 graphically depicting the relative rank of the Feature Set. Other columns present common genes, common features, p-values, Q-values, and species of origin.

After presenting the ranked list of Feature Sets as a result of the query, the process may be complete. However, in some embodiments, a Results window in a user interface allows the user to conduct further queries using the Feature Set provided as the query input. For example, as indicated at decision operation 1309, the system may allow users to query Feature Groups. Thus, if decision 1309 is answered in the affirmative (i.e., the user provides a command query on Feature Groups), the system next compares the query Feature Set against all Feature Groups from the field of search to produce a ranked list of Feature Groups, in a similar manner to generating the ranked list of other Feature Sets in operation 1305. See block 1311. After producing the ranked list of Feature Groups, the system next presents that ranked list of Feature Groups via a user interface as a result of the query as indicated in block 1313.

FIG. 13C presents a screen shot 1361 of a results window of the type that may be presented during operation 1313 (i.e., it presents results of a Feature Set versus Feature Groups query). In the specific example of FIG. 13C, a pituitary-specific genes bioset was queried against all Feature Groups (biogroups in this example). As shown, results are presented as a list of ranked biogroups depicted as rows 1363. Each biogroup is provided with a biogroup name, a rank score, a p-value, a Q-value, etc.

The embodiment depicted in FIG. 13A presents yet another avenue for expanding a query on the input Feature Set. This is triggered via an event detected at decision block 1315 which determines whether the system has received a command to query on Features of the input Feature Set. If so, the system runs and presents results of the query on each individual feature within the input Feature Set. See block 1317. This operation is depicted in more detail in FIG. 14. After presenting the results of the query on Features, the process is complete. In certain embodiments, where the user does not elect to perform a query on Feature Groups and/or the individual features of the input Feature Set, the process ends earlier as indicated by the process control paths from decision operations 1309 and 1315.

FIG. 14 depicts a process flow that may be employed to implement operation 1317 of FIG. 13A. Specifically, the flow chart depicts a series of steps that may be employed to run and present results of a query based on individual features of the Feature Set used as a query input. As depicted, the process begins at an operation 1401 where the system identifies a "next" feature in the query Feature Set. Typically, the process will consider each feature of the input Feature Set in turn and generate a ranked list of matching Feature Sets for such features.

After setting the Feature for the current iteration, the process next identifies all other Feature Sets within the field of search containing that current feature. See block 1403. In many cases, this feature may be a gene and the Feature Sets identified at block 1403 are all the other Feature Sets (in the field of search) that contain such gene.

After identifying each of the other Feature Sets containing the current Feature, the system ranks those Feature Sets based on a ranking of the current Feature within the identified Feature Sets. See block 1405. For example, a given Feature Set may rank individual genes (features) based upon their fold change, p-value, or other criterion. Whichever one of these criteria is used to rank features within the Feature Sets defines the ranking of the identified Feature Set in this feature-based query.

Iteration over multiple features in the query Feature Set is controlled as indicated at a decision block 1407. After all features in the query Feature Set have been considered, the system presents a ranked list of Feature Sets (one for each feature in the query Feature Set). In other words, a user may view a Feature Set used as a query input in terms of the individual features (e.g., genes) contained therein and select any one of these features/genes to view a ranked list of all the other Feature Sets in the field of search that contain the selected feature.

Figure 15A:
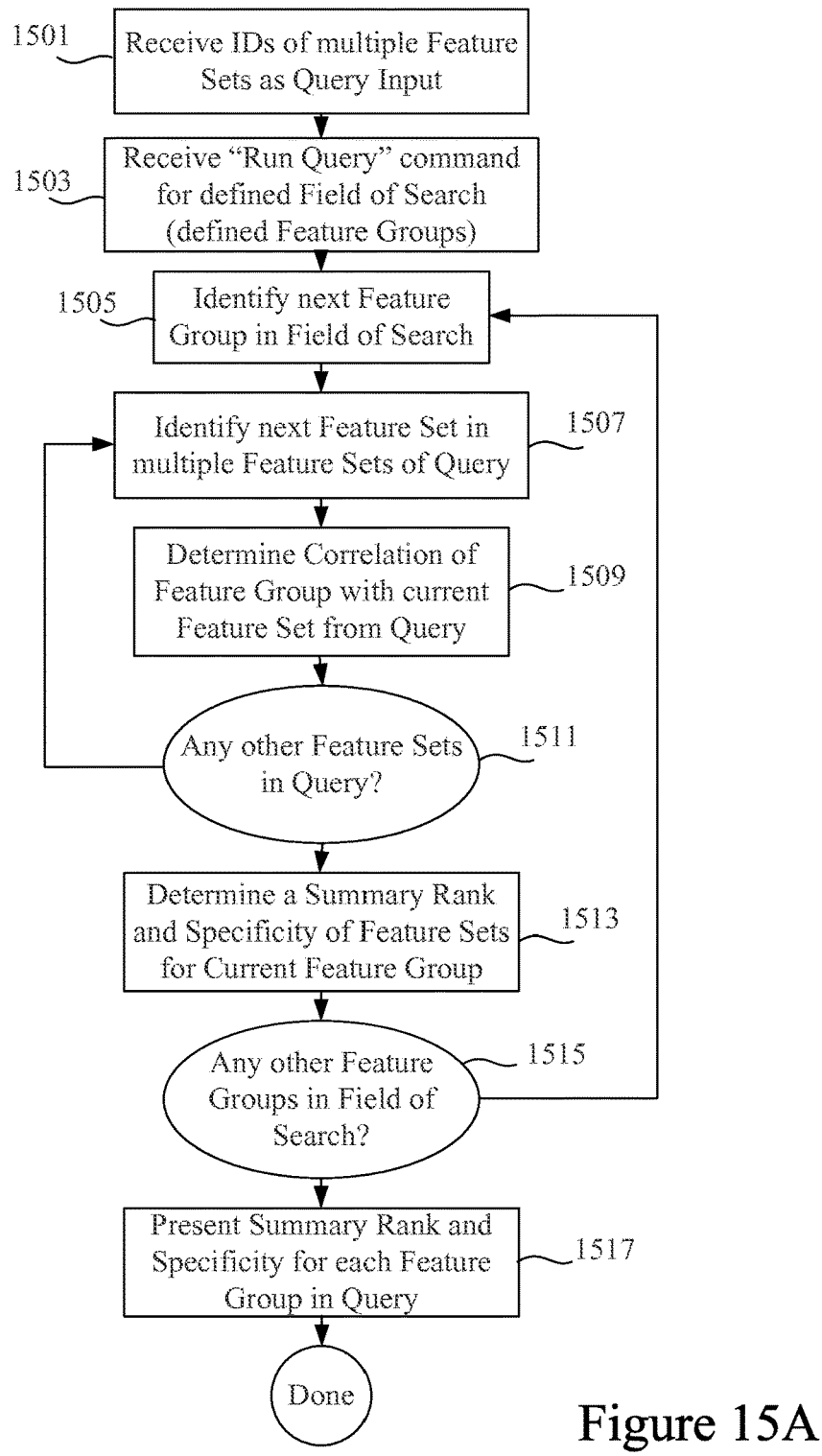
FIG. 15A is a process flow diagram illustrating some operations in processing a query employing multiple Feature Sets as the query input and one or more Feature Groups as a field of search.

FIG. 15A depicts a process flow that may be employed in certain embodiments of this invention to process queries that use multiple Feature Sets as inputs. As indicated at block 1501, the system receives the identities of the multiple Feature Sets that serve as the query input. Typically, the field of search will be delimited by one or more Feature Groups.

Upon receiving a "Run Query" command for the defined field of search (one or more Feature Groups), the system begins the process of matching each Feature Set in the query against a first Feature Group. See block 1503, 1505 and 1507. The block 1505 controls iterations over the individual Feature Groups defining the field of search, while block 1507 controls iteration on the individual Feature Sets provided as an input to the query.

Within an inner loop processing individual Feature Sets, the system determines the correlation of the current Feature Group with the current Feature Set from the query. See block 1509. The correlation for this Feature Set-Feature Group pair is then stored for later use. As indicated at a decision block 1511, the system thereafter determines whether there are any other Feature Sets to be considered in the query. Of course, there will be at least two Feature Sets in a multiple Feature Set query. Therefore, operation 1511 is answered in the affirmative at least once. Each time this occurs, process control loops back to block 1507 where the next Feature Set in the query is identified. Thereafter its correlation with the current Feature Group is determined and saved at block 1509.

After all Feature Sets of the query have been considered for a given Feature Group, decision block 1511 is answered in the negative and process control is directed to a block 1513 where the system determines a "summary" rank and a "specificity" of the various Feature Sets of the query against the current Feature Group. In certain embodiments, the summary rank is determined from the individual ranks (correlations) of each Feature Set with the current Feature Group. In one approach, the summary rank is determined as a mean or median of each of the correlations/scores for the query Feature Sets against the current Feature Group. In another approach, the summary rank is determined as the maximum score/correlation of the various Feature Sets against the current Feature Group. The specificity indicates the fraction of query input Feature Sets that have a strong correlation with the Feature Group under consideration (e.g., a correlation of greater than a defined value). For example, 3 of 5 Feature Sets from the input query may meet this criterion. In such case, 3/5 would be the specificity value.

After operation 1513 is complete, the process determines whether there are any other Feature Groups to be considered in the field of search. See decision block 1515. If so, process control is directed back to block 1505 where the next Feature Group in the field of search is considered. The algorithm then repeats as described above, iterating on each of the various Feature Sets identified in the query. At the end of this iteration, a new summary rank and specificity is provided for the current Feature Group.

Ultimately, each of the Feature Groups identified in the field of search are considered and decision 1515 is answered in the negative. At that point, process control is directed to a block 1517 where the system presents the summary rank and specificity for each Feature Group in the query. The process is then completed.

Figure 15B:
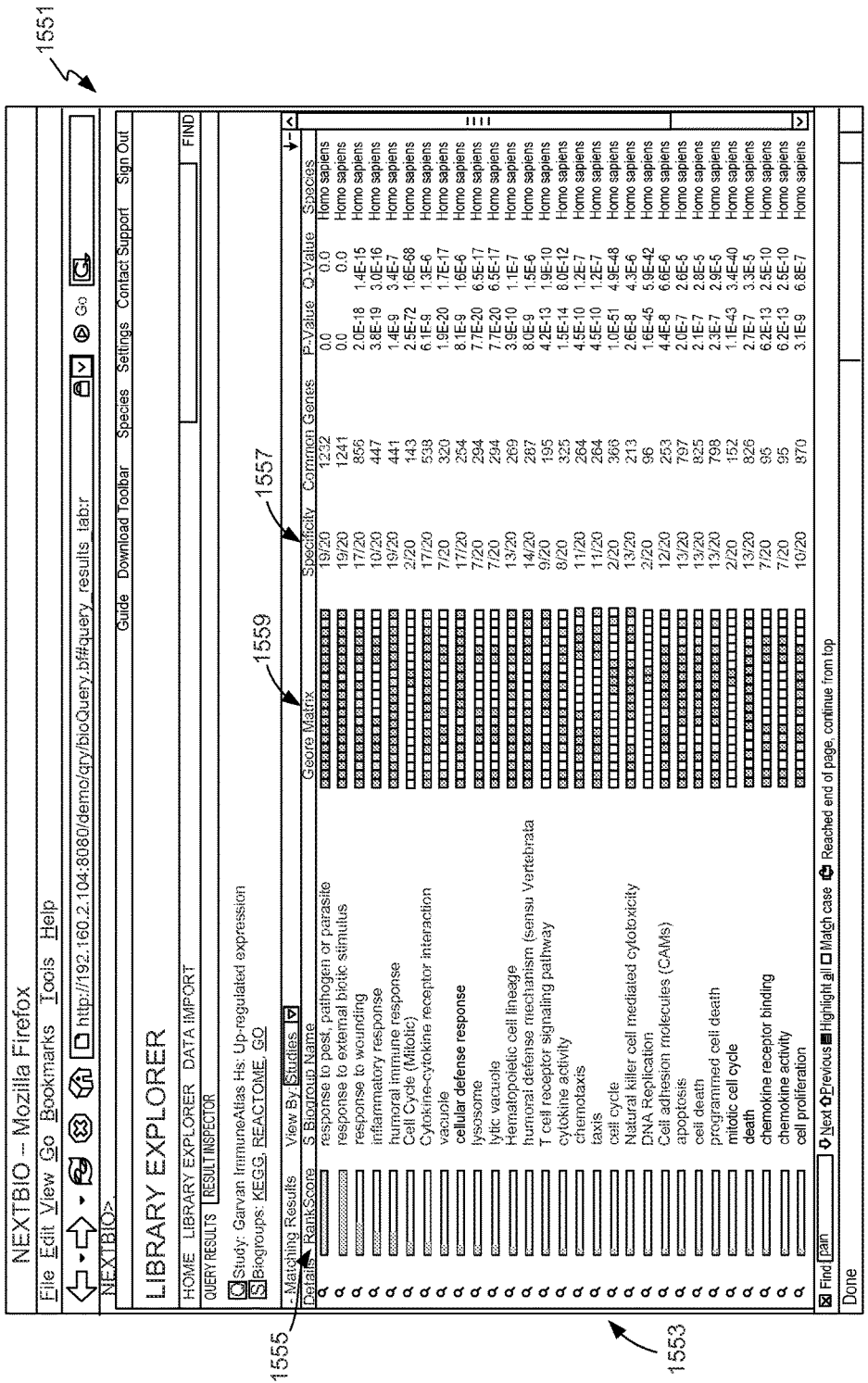
FIG. 15B is a screen shot presenting results of a multiple Feature Sets versus Feature Groups query.

FIG. 15B presents a screen shot 1551 of a user interface presenting results of a multiple Feature Sets versus Feature Groups query (e.g., the result of operation 1517). This specific example shows biosets representing different immune cell-type specific genes queried against all Feature Groups (biogroups) in a Knowledge Base. The biogroups are presented in rank order as rows 1553. Each row shows, in addition to a biogroup name, a summary rank 1555, a specificity 1557, and a score matrix 1559, which uses different hues or color intensities to depict the strength of the correlations of each bioset in the query input versus the biogroup in the row. Each block in the matrix represents a different query bioset.

Figure 15C:
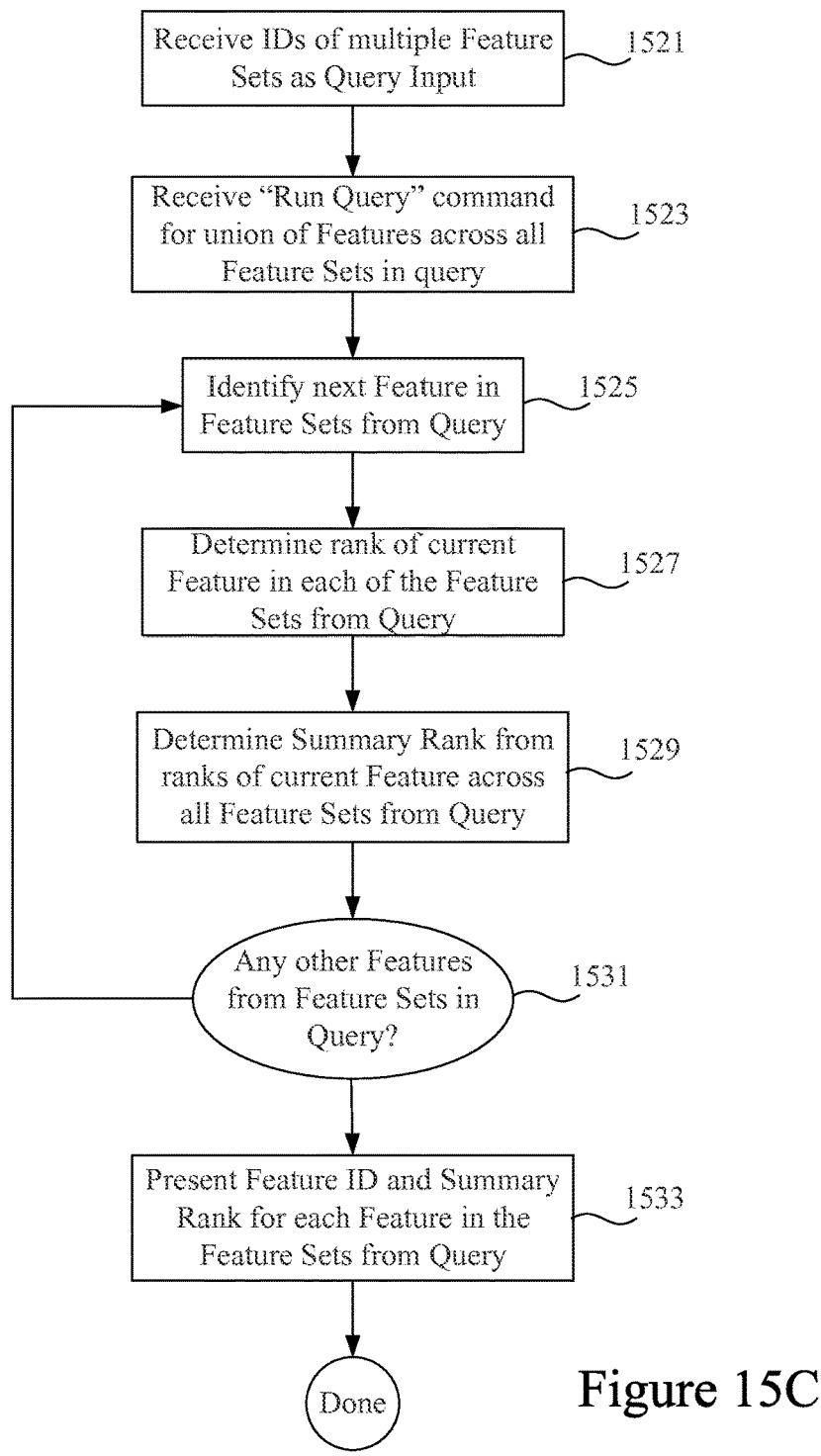
FIG. 15C is a process flow diagram illustrating some operations in processing a query employing Features from multiple Feature Sets as the query input.

In some embodiments, querying multiple Feature Sets also involves a query relative to all known features in the multiple Feature Sets. This produces a ranked list of each feature in the query Feature Sets. An embodiment of this feature is depicted in FIG. 15C, where the process begins with receipt of multiple Feature Sets as the query input and a "Run Query" command. See blocks 1521 and 1523.

The process iterates over the various features in the query Feature Sets as illustrated at blocks 1525 through 1531. The iteration begins by identifying the next feature from the Feature Sets as indicated at block 1525. It then proceeds to determine the rank of the current Feature in each of the Feature Sets from the query. See block 1527. As explained above, such ranking may be based on various criteria specified in the Feature sets (e.g., p-value or fold-change). Next the process determines a summary rank from individual ranks of the current feature across all Feature Sets in Query. See block 1529. The summary rank may be calculated, for example, as the maximum rank or a mean or median rank over all the query Feature Sets.

After determining the summary rank for the feature under consideration, the process determines whether there are any further features to be considered from the query Feature Sets. See decision block 1531. If so, the process returns to operation 1525, where the next feature from the Feature Sets is selected for another iteration, which results in calculation of a summary rank over the query Feature Sets. This process is continued until all features in the query Feature Sets have been considered and given a summary score. At this point, decision 1531 is answered in the negative. At that point, the results of the query may be presented (block 1533). In certain embodiments, the system presents a Feature ID and summary rank for each feature in the Feature Groups from the query. In certain embodiments a specificity of the Feature across the query Feature Groups is also presented. This information is typically displayed to the user when he or she selects any one of the features in the query Feature Sets.

Figure 15D:
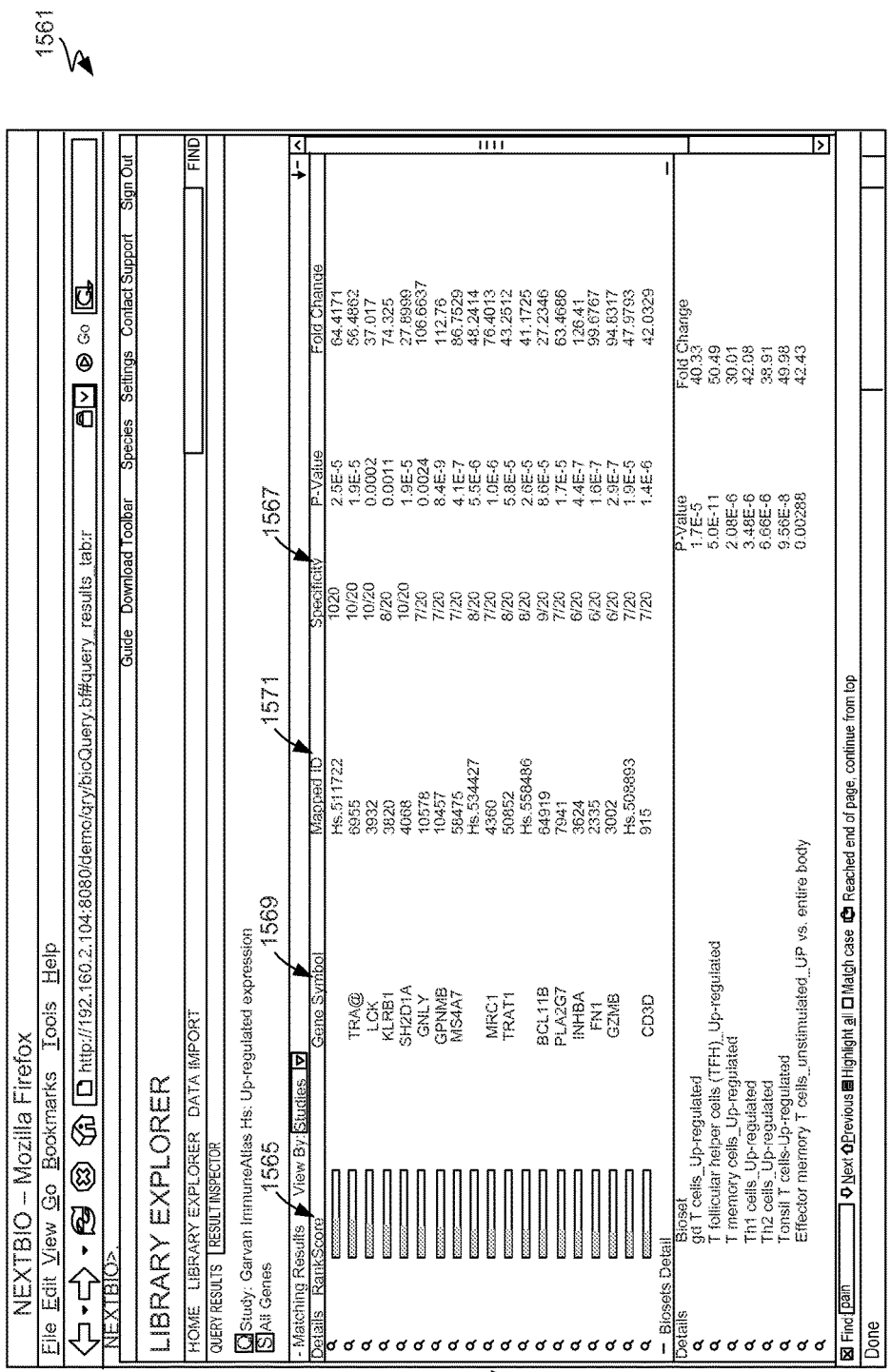
FIG. 15D is a screen shot presenting results of a multiple Feature Sets versus all features query.

FIG. 15D shows a screen shot 1561 of a user interface presenting results of a multiple Feature Sets versus all features query. As shown, the individual genes (features) presented at 1533 are depicted as rows 1563 in a ranked list. Characteristics presented for each gene include a rank score 1565, specificity 1567, gene symbol 1569, and mapped ID 1571.

At this point, a Feature Group type query will be described with reference to FIG. 16A. As shown there, a process begins by receiving a Feature Group as a query input (block 1601). This input should be contrasted with the queries depicted in FIGS. 13-15, where the query input was one or more Feature Sets. Like the embodiments described above, the embodiment of FIG. 16A executes a query upon receiving a "Run Query" command (block 1603). The querying system then runs the query by comparing the query Feature Group against all Feature Sets in the field of search to produce a ranked list of Feature Sets (block 1605). In certain embodiments, the ranking is provided from precomputed results in the Scoring Table. As indicated, correlations between every Feature Group and every Feature Set are precomputed and stored in the Knowledge Base. This allows the system to quickly and efficiently generate a ranked list of the Feature Group under consideration paired with every Feature Set in the Knowledge Base. After the query has been run and the ranked list has been produced, the list is presented as a result to the user via a display or other output (block 1607). The resulting Feature Sets may be presented as such or via an appropriate container—e.g., a Study or taxonomy keyword.

Figure 16A:
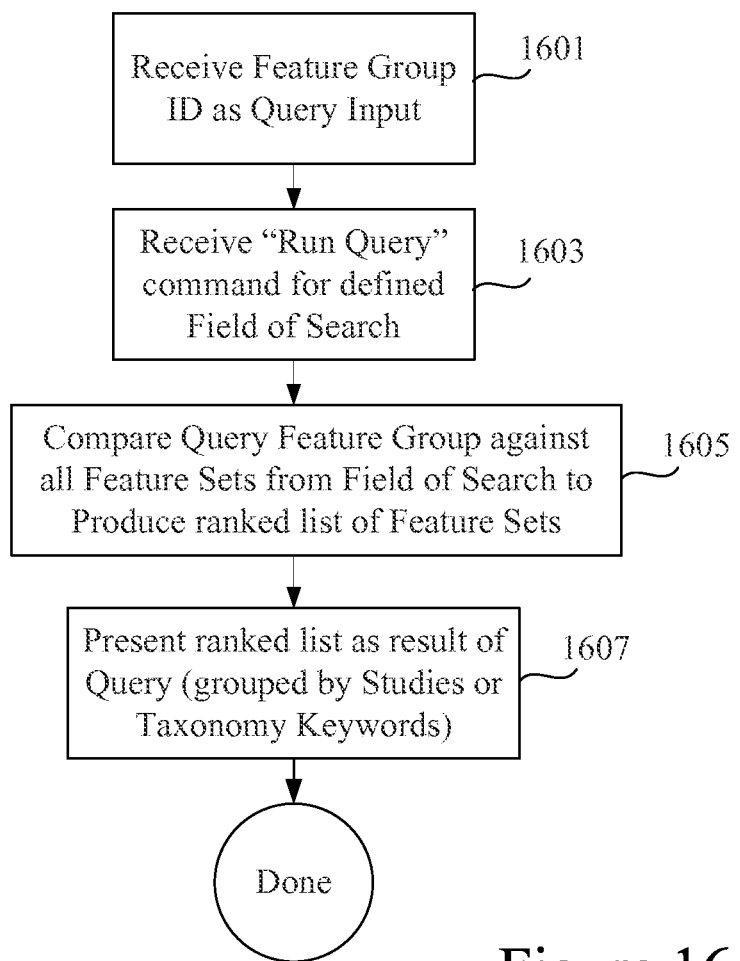
FIG. 16A is a process flow diagram depicting some operations in a Feature Group type query in accordance with certain embodiments.

Note that the process depicted in FIG. 16A employs only a single Feature Group as query input. In certain embodiments, the query may present multiple Feature Groups as the query input. In such cases, the process depicted in FIG. 16A would be repeated for each Feature Group.

Figure 16B:
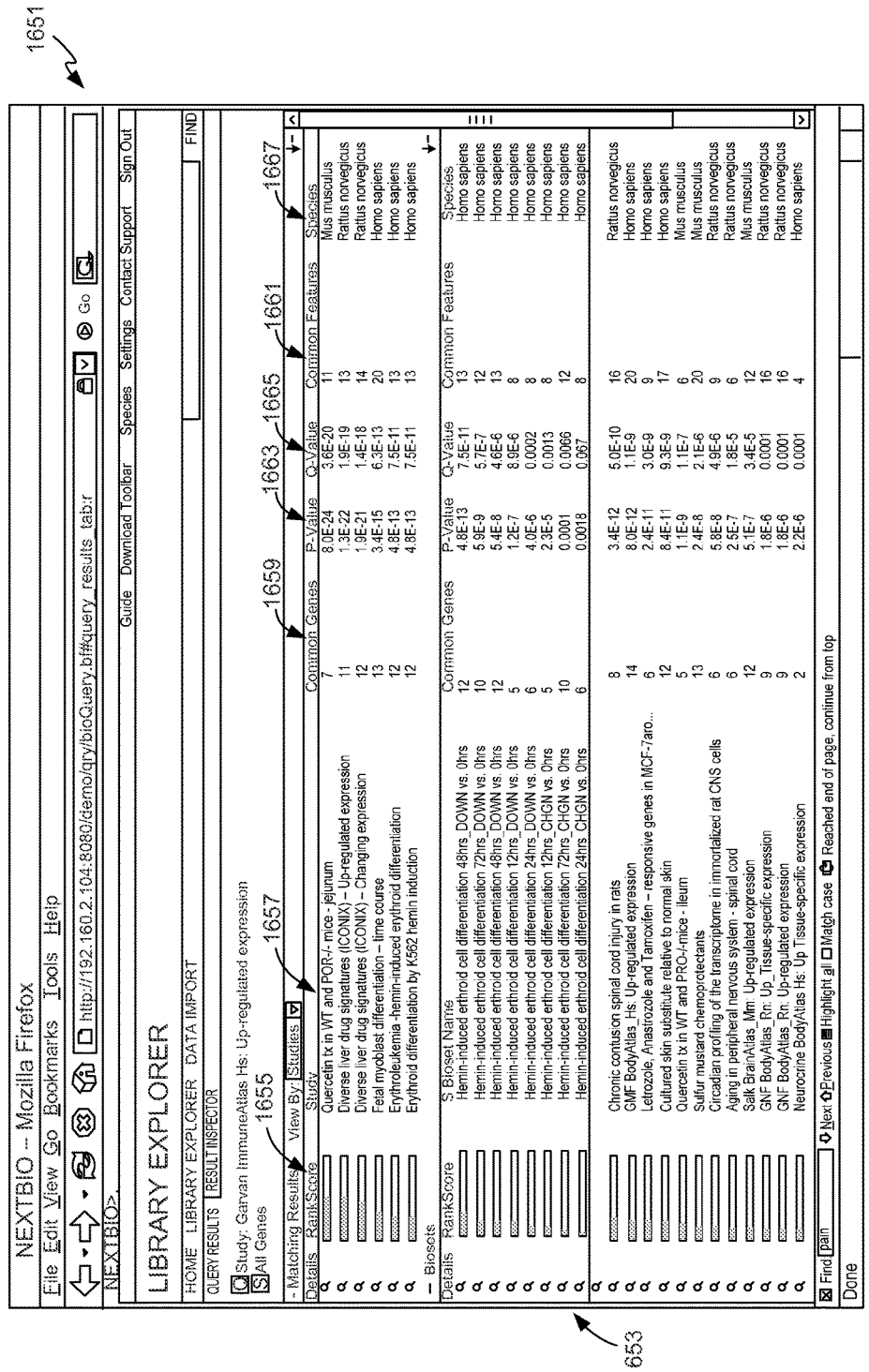
FIG. 16B is a screen shot from a user interface window showing results of a Feature Groups versus Feature Sets query.

FIG. 16B presents a screen shot from a user interface window 1651 showing results of a Feature Groups versus Feature Sets query. In the specific example shown, a "cholesterol biosynthesis" gene biogroup is queried across all Feature Sets in a Knowledge Base. The results are presented as Studies which contain the biosets encountered in the query. Each Study (and in some cases biogroups within a Study) is presented in rows 1653. Query information provided for each Study/biogroup includes a rank score 1655, a Study name 1657, common genes 1659, common features 1661, p-value 1663, Q-value 1665, and species of origin 1667.

Yet another type of query is a feature query. The query input to feature query is an individual feature (e.g., a gene, SNP, chemical compound, etc.). In certain embodiments, running the feature query involves identifying Feature Sets containing the feature of interest within a Knowledge Base. The identified Feature Sets may be ranked based upon the ranking of the feature within the Feature Sets.

Figure 17A:
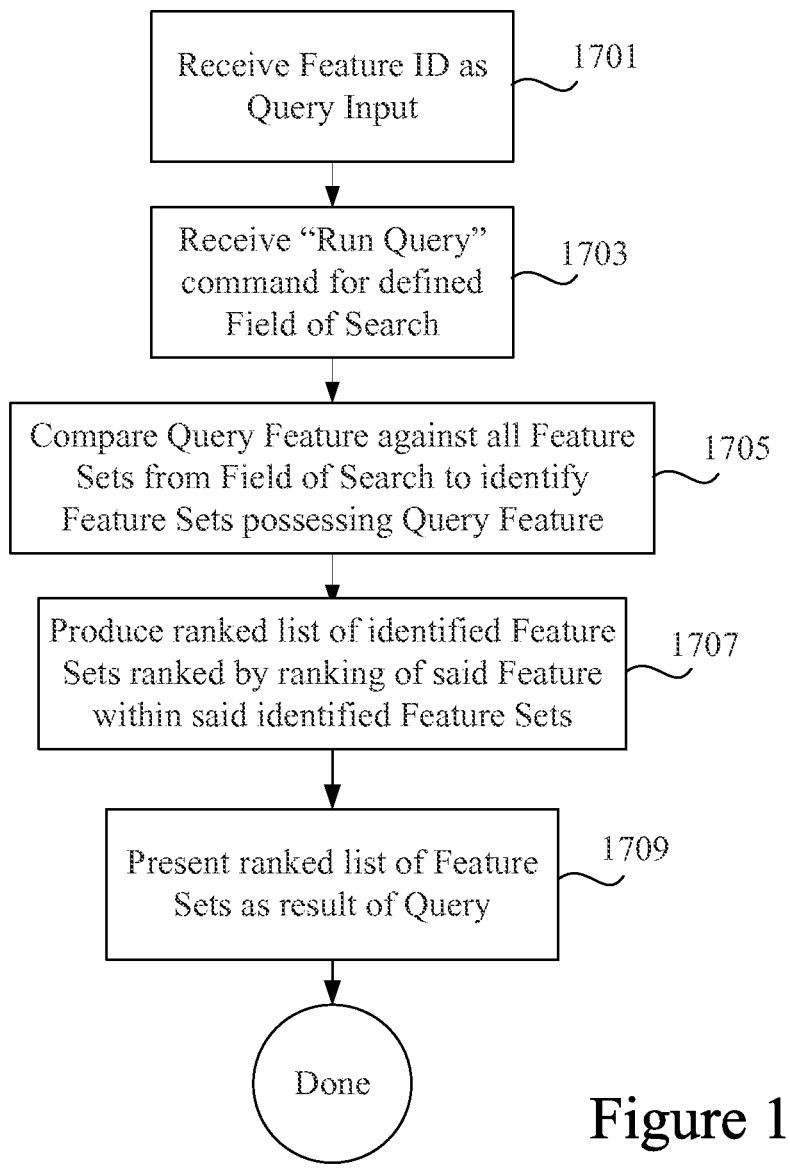
FIG. 17A is a process flow diagram depicting some operations in a feature type query in accordance with certain embodiments.

FIG. 17A presents one example of an algorithm for running feature queries. As illustrated, the process begins by receiving the identity of a feature input (block 1701) followed by receiving a "Run Query" command in the field of search (block 1703). The query is run by comparing the query feature against all Feature Sets in the field search (block 1705). The comparison identifies those Feature Sets possessing the query feature. Next the system produces a ranked list of the identified Feature Sets, where the ranking is based on individual ranks of the query feature within each of the identified Feature Sets (block 1707). For example, in one Feature Set, the Feature may have a p-value 0.2 and in another Feature Set, the same feature may have a p-value of 0.1. The later Feature Set would be given a higher rank if p-value were used as the ranking criterion. The operation in the depicted feature query involves presenting to the user the ranked list of Feature Sets (i.e., the query result). See block 1709. As in other embodiments described herein, the resulting Feature Sets may be conveniently displayed as the Studies or taxonomy groups to which they belong.

Figure 17B:
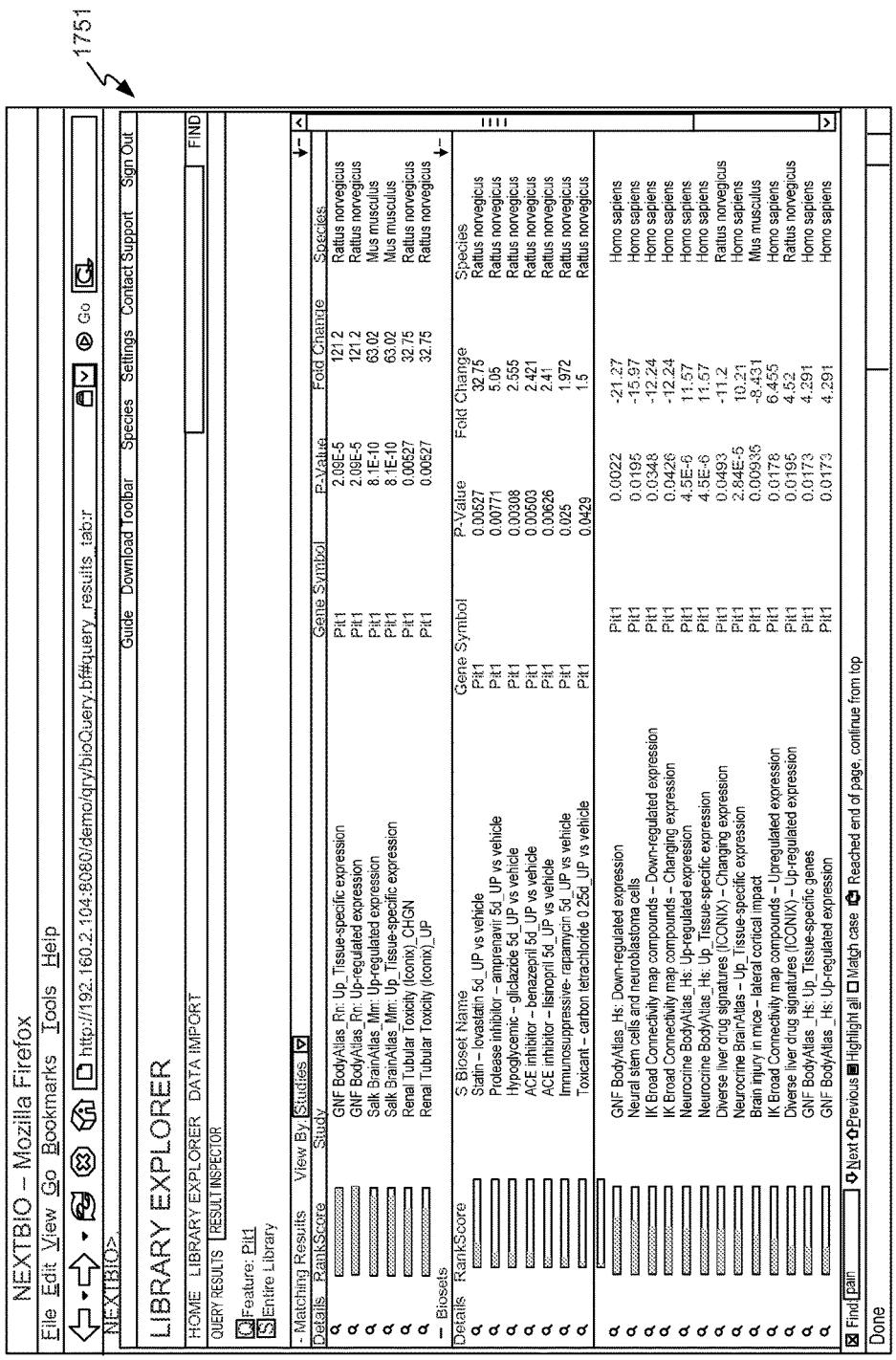
FIG. 17B is a screen shot of a user interface window displaying results of a feature versus all Feature Sets in a Knowledge Base.

FIG. 17B presents a screen shot of a user interface window 1751 displaying results of a feature versus all Feature Sets in a Knowledge Base. In this specific example, the Pit1 gene is queried across all Feature Sets. As shown, the Feature Sets (biosets) returned by the query are presented in rows 1753 (Studies or biosets). The rank score, gene symbol, p-value, fold change, and species of origin are depicted for each bioset.

FIG. 18 presents a query input screen 1801 in accordance with certain embodiments. The input screen includes the following main portions: (i) a browsing region 1803 for identifying features, Feature Sets, and/or Feature Groups for entering as input to the query, (ii) a "Q" box 1805 (query setup panel) for specifically identifying the features, Feature Sets, and/or Feature Groups that are to serve as input for the query, and (iii) a "S" box 1807 (query search space panel) for specifically identifying any features, Feature Sets, Feature Groups, Studies, Projects, taxonomy groups, etc. that are to serve to delimit the field of search in a query having inputs identified in region 1805. An arrow or other user interface tool may be employed to add Features, Feature Sets, etc. to S box 1807 or Q box 1805. Note that query input screen 1801 also has a "Run Query" button 1809 for initiating the query. Also, note that in browsing region 1803, the user is provided with the option of reviewing biosets, tags, and associated files to facilitate locating information to be used in formulating queries.

Other modes of querying can take advantage of the Knowledge Base content and architecture described herein. One of these involves querying using taxonomy keywords such as the tags that may be associated with Feature Sets. Alternatively, or in addition, users may formulate queries using Studies or Projects provided in the Knowledge Base. Both taxonomy groups and Studies/Projects can be used to define the query (Q box) or delimit the field of search (S box). Still other features that may be employed to view or browse content include, in certain embodiments, an atlas for presenting Feature Sets or other content related to a particular anatomical region of an organism (e.g., a mouse brain) and a genome tab for bringing up lists of genes on a particular organisms genome or chromosomes (for higher organisms such as mice, humans, etc.).

4. Computer Hardware

As should be apparent, certain embodiments of the invention employ processes acting under control of instructions and/or data stored in or transferred through one or more computer systems. Certain embodiments also relate to an apparatus for performing these operations. This apparatus may be specially designed and/or constructed for the required purposes, or it may be a general-purpose computer selectively configured by one or more computer programs and/or data structures stored in or otherwise made available to the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines is shown and described below.

In addition, certain embodiments relate to computer readable media or computer program products that include program instructions and/or data (including data structures) for performing various computer-implemented operations associated with at least the following tasks: (1) obtaining raw data from instrumentation, databases (private or public (e.g., NCBI), and other sources, (2) curating raw data to provide Feature Sets, (3) importing Feature Sets and other data to a repository such as database or Knowledge Base, (4) mapping Features from imported data to pre-defined Feature references in an index, (5) generating a pre-defined feature index, (6) generating correlations or other scoring between Feature Sets and Feature Sets and between Feature Sets and Feature Groups, (7) creating Feature Groups, (8) receiving queries from users (including, optionally, query input content and/or query field of search limitations), (9) running queries using features, Feature Groups, Feature Sets, Studies, taxonomy groups, and the like, and (10) presenting query results to a user (optionally in a manner allowing the user to navigate through related content perform related queries). The invention also pertains to computational apparatus executing instructions to perform any or all of these tasks. It also pertains to computational apparatus including computer readable media encoded with instructions for performing such tasks.

Further the invention pertains to useful data structures stored on computer readable media. Such data structures include, for example, Feature Sets, Feature Groups, taxonomy hierarchies, feature indexes, Score Tables, and any of the other logical data groupings presented herein. Certain embodiments also provide functionality (e.g., code and processes) for storing any of the results (e.g., query results) or data structures generated as described herein. Such results or data structures are typically stored, at least temporarily, on a computer readable medium such as those presented in the following discussion. The results or data structures may also be output in any of various manners such as displaying, printing, and the like.

Examples of tangible computer-readable media suitable for use computer program products and computational apparatus of this invention include, but are not limited to, magnetic media such as hard disks, floppy disks, and magnetic tape; optical media such as CD-ROM disks; magneto-optical media; semiconductor memory devices (e.g., flash memory), and hardware devices that are specially configured to store and perform program instructions, such as read-only memory devices (ROM) and random access memory (RAM). The data and program instructions provided herein may also be embodied on a carrier wave or other transport medium (including electronic or optically conductive pathways).

Examples of program instructions include low-level code, such as that produced by a compiler, as well as higher-level code that may be executed by the computer using an interpreter. Further, the program instructions may be machine code, source code and/or any other code that directly or indirectly controls operation of a computing machine. The code may specify input, output, calculations, conditionals, branches, iterative loops, etc.

Figure 19:
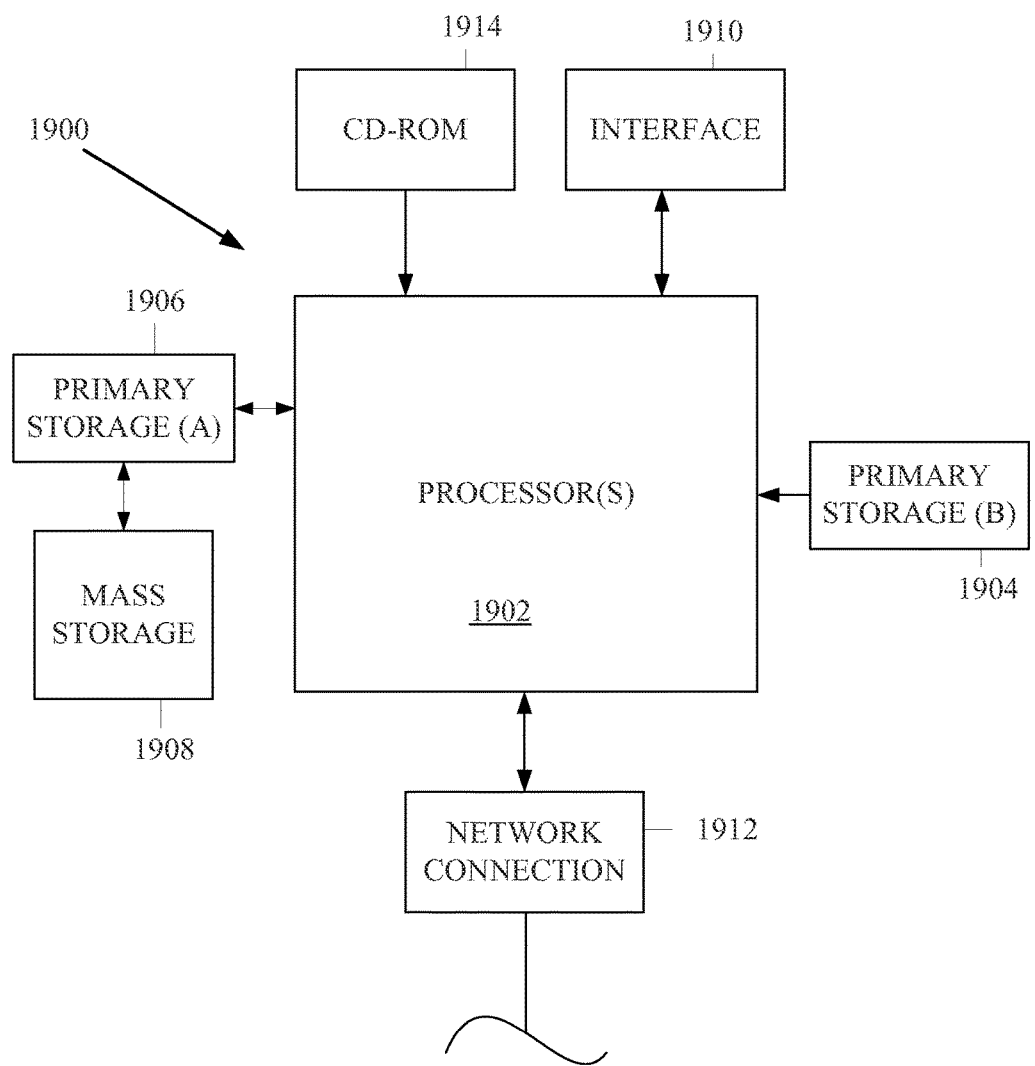
FIG. 19 is a diagrammatic representation of a computer system that can be used with the methods and apparatus described herein.

FIG. 19 illustrates, in simple block format, a typical computer system that, when appropriately configured or designed, can serve as a computational apparatus according to certain embodiments. The computer system 1900 includes any number of processors 1902 (also referred to as central processing units, or CPUs) that are coupled to storage devices including primary storage 1906 (typically a random access memory, or RAM), primary storage 1904 (typically a read only memory, or ROM). CPU 1902 may be of various types including microcontrollers and microprocessors such as programmable devices (e.g., CPLDs and FPGAs) and non-programmable devices such as gate array ASICs or general-purpose microprocessors. In the depicted embodiment, primary storage 1904 acts to transfer data and instructions uni-directionally to the CPU and primary storage 1906 is used typically to transfer data and instructions in a bi-directional manner. Both of these primary storage devices may include any suitable computer-readable media such as those described above. A mass storage device 1908 is also coupled bi-directionally to primary storage 1906 and provides additional data storage capacity and may include any of the computer-readable media described above. Mass storage device 1908 may be used to store programs, data and the like and is typically a secondary storage medium such as a hard disk. Frequently, such programs, data and the like are temporarily copied to primary memory 1906 for execution on CPU 1902. It will be appreciated that the information retained within the mass storage device 1908, may, in appropriate cases, be incorporated in standard fashion as part of primary storage 1904. A specific mass storage device such as a CD-ROM 1914 may also pass data uni-directionally to the CPU or primary storage.

CPU 1902 is also coupled to an interface 1910 that connects to one or more input/output devices such as such as video monitors, track balls, mice, keyboards, microphones, touch-sensitive displays, transducer card readers, magnetic or paper tape readers, tablets, styluses, voice or handwriting recognition peripherals, USB ports, or other well-known input devices such as, of course, other computers. Finally, CPU 1902 optionally may be coupled to an external device such as a database or a computer or telecommunications network using an external connection as shown generally at 1912. With such a connection, it is contemplated that the CPU might receive information from the network, or might output information to the network in the course of performing the method steps described herein.

In one embodiment, a system such as computer system 1900 is used as a data import, data correlation, and querying system capable of performing some or all of the tasks described herein. System 1900 may also serve as various other tools associated with Knowledge Bases and querying such as a data capture tool. Information and programs, including data files can be provided via a network connection 1912 for downloading by a researcher. Alternatively, such information, programs and files can be provided to the researcher on a storage device.

In a specific embodiment, the computer system 1900 is directly coupled to a data acquisition system such as a microarray or high-throughput screening system that captures data from samples. Data from such systems are provided via interface 1912 for analysis by system 1900. Alternatively, the data processed by system 1900 are provided from a data storage source such as a database or other repository of relevant data. Once in apparatus 1900, a memory device such as primary storage 1906 or mass storage 1908 buffers or stores, at least temporarily, relevant data. The memory may also store various routines and/or programs for importing, analyzing and presenting the data, including importing Feature Sets, correlating Feature Sets with one another and with Feature Groups, generating and running queries, etc.

Although the above has generally described certain embodiments according to specific processes and apparatus, the subject matter of the description provided has a much broader range of implementation and applicability. Those of ordinary skill in the art will recognize other variations, modifications, and alternatives.

What is claimed is:

1. A method, implemented using one or more computers comprising one or more processors and system memory, of integrating data in a database of scientific information, the method comprising:
   (a) receiving, by the one or more processors, an input feature set, said input feature set comprising a data structure comprising a table comprising (i) a list of input features and (ii) a list of associated statistical information, wherein the features comprise genes, SNPs, SNP patterns, portions of genes, regions of a genome, proteins, compounds, metabolites, or phenotypes;
   (b) receiving, by the one or more processors, an index set comprising (i) a plurality of feature identifiers representing a plurality of features, and (ii) a plurality of globally unique mapping identifiers, wherein
   each feature identifier points to one or more globally unique mapping identifiers,
   two or more feature identifiers of the plurality of feature identifiers point to a same globally unique mapping identifier, the two or more feature identifiers are related to each other by at least one of: nomenclature-based, sequence-based, activity-based, regulatory-based, function-based, or structure-based relationships, and
   each globally unique mapping identifier has a unique address in the index set;
   (c) automatically mapping, by the one or more processors, the input features in the input feature set to a subset of feature identifiers in the index set, wherein the subset of feature identifiers represents the input features and points to a subset of globally unique mapping identifiers in the index set, thereby providing first mapping information between the input features and the subset of globally unique mapping identifiers;
   (d) providing, by the one or more processors, second mapping information between at least some pre-existing features of a plurality of pre-existing feature sets in the database and at least some of the subset of globally unique mapping identifiers, wherein the input feature set and the plurality of pre-existing feature sets are obtained from different experiments, platforms, or organisms;
   (e) generating, by the one or more processors, an alignment scheme between the input feature set and the plurality of pre-existing feature sets in the database using the first mapping information and the second mapping information;
   (f) automatically correlating, by the one or more processors, the input feature set with the plurality of pre-existing feature sets in the database using the alignment scheme; and
   (g) automatically storing, by the one or more processors, the correlation information in (f) on a non-transitory machine readable medium for use in responding to queries involving feature sets.

2. The method of claim 1, wherein the statistical information is selected from the group consisting of: p-values or fold changes indicating differential expression or abundance of at least some features, values indicating responses of at least some features to a treatment or stimulus, values indicating an association of at least some features with a phenotypic characteristic, and any combination thereof.

3. The method of claim 1, wherein the input feature set and the pre-existing feature sets each include a list of features and associated statistical information.

4. The method of claim 3, wherein the statistical information is selected from the group consisting of: p-values or fold changes indicating differential expression or abundance of at least some features, values indicating responses of at least some features to a treatment or stimulus, values indicating an association of at least some features with a phenotypic characteristic, and any combination thereof.

5. The method of claim 1, wherein the two or more feature identifiers of (b) are related to each other by a sequence-based relationship.

6. The method of claim 1, wherein the two or more feature identifiers of (b) are related to each other by a regulatory-based relationship.

7. The method of claim 1, wherein the two or more feature identifiers of (b) are related to each other by a sequence-based relationship and a regulatory-based relationship.

8. A method, implemented using one or more computers comprising one or more processors and system memory, of conducting a query in a database comprising a plurality of feature sets or feature groups, each feature set comprising a plurality of features and associated statistical information and each feature group comprising a list of related features, the features being genes, SNPs, SNP patterns, portions of genes, regions of a genome, proteins, compounds, metabolites, or phenotypes, the method comprising:

receiving, by one or more processors of the one or more computers, a query identifying one or more feature sets or feature groups in the plurality of feature sets or feature groups, wherein the query is received from a user input to a computer system, and wherein the plurality of feature sets or feature groups was obtained from different experiments, studies, platforms, or organisms;

retrieving, by one or more processors of the one or more computers, precomputed correlation scores between the one or more feature sets or feature groups and other feature sets or feature groups in the database, wherein the precomputed correlation scores were computed by:

(a) receiving, by one or more processors of the one or more computers, an input feature set comprising a data structure comprising a table comprising (i) a list of input features and (ii) a list of associated statistical information;

(b) receiving, by one or more processors of the one or more computers, an index set comprising (i) a plurality of feature identifiers representing a plurality of features, and (ii) a plurality of globally unique mapping identifiers, wherein each feature identifier points to one or more globally unique mapping identifiers, two or more feature identifiers of the plurality of feature identifiers point to a same globally unique mapping identifier, the two or more feature identifiers are related to each other by at least one of: nomenclature-based, sequence-based, activity-based, regulatory-based, function-based, or structure-based relationships, and each globally unique mapping identifier has a unique address in the index set;

(c) automatically mapping, by one or more processors of the one or more computers, the input features in the input feature set to a subset of feature identifiers in the index set, wherein the subset of feature identifiers represents the input features and points to a subset of globally unique mapping identifiers in the index set, thereby providing first mapping information between the input features and the subset of globally unique mapping identifiers;

(d) providing, by one or more processors of the one or more computers, second mapping information between at least some pre-existing features of a plurality of pre-existing feature sets or feature groups in the database and at least some of the subset of globally unique mapping identifiers, wherein the plurality of pre-existing feature sets or feature groups comprises the other feature sets or feature groups in the database;

(e) generating, by one or more processors of the one or more computers, an alignment scheme between the input feature set and the plurality of pre-existing feature sets or feature groups in the database using the first mapping information and the second mapping information; and (f) correlating, by one or more processors of the one or more computers, the input feature set with the plurality of pre-existing feature sets or feature groups in the database using the alignment scheme to generate the precomputed correlation scores between the one or more feature sets or feature groups and the other feature sets or feature groups in the database;

ranking, by one or more processors of the one or more computers, features, feature sets or feature groups using the precomputed correlation scores between the one or more feature sets or feature groups and the other feature sets or feature groups in the database; and outputting on a display device a ranked list of the features, feature sets or feature groups as determined by the ranking using the precomputed correlation scores.

9. The method of claim 8, further comprising receiving a field of search limiting content of the database against which the one or more feature sets or feature groups identified in the query are compared.

10. The method of claim 8, wherein at least one identified feature group is queried across one or more feature sets and the user is presented with a ranked list of feature sets.

11. The method of claim 8, wherein at least one identified feature set is queried across one or more feature sets and the user is presented with a ranked list of feature sets.

12. The method of claim 8, wherein at least one identified feature set is queried across one or more feature groups and the user is presented with a ranked list of feature groups.

13. The method of claim 8, wherein at least one identified feature set is queried across one or more features and the user is presented with a ranked list of features.

14. The method of claim 8, wherein the query identifying one or more of said feature sets or feature groups is received via a user interface having regions for (a) inputting or selecting content for query, and (b) limiting a field of search within the database.

15. The method of claim 8, wherein the features comprise genes of an organism.

16. The method of claim 8, wherein the features comprise chemical compounds.

17. The method of claim 8, wherein the features comprise SNPs.

18. The method of claim 8, wherein the precomputed correlation scores are generated by performing a rank-based statistical algorithm.

19. The method of claim 8, wherein the associated statistical information is selected from the group consisting of: p-values or fold changes indicating differential expression or abundance of at least some features, values indicating responses of at least some features to a treatment or stimulus, values indicating an association of at least some features with a phenotypic characteristic, and any combination thereof.

20. The method of claim 8, wherein the database comprises a scoring table of the precomputed correlation scores, which are provided between each feature set or feature group and all other feature sets in the database.

21. The method of claim 8, wherein:

the mapping information that associate features of the one or more feature sets or feature groups with features of the other feature sets or feature groups in the database comprises a plurality of globally unique mapping identifiers, and each globally unique mapping identifier represents a globally unique feature in the database.

* * * * *